United States Patent [19]

Benson et al.

[11] Patent Number: 5,257,368
[45] Date of Patent: Oct. 26, 1993

[54] SYSTEM FOR DYNAMICALLY CHANGING A SYSTEM I/O CONFIGURATION BY DETERMINING DIFFERENCES BETWEEN CURRENT AND FUTURE CONFIGURATIONS AND DESCRIBING DIFFERENCES TO SOFTWARE AND HARDWARE CONTROL BLOCKS

[75] Inventors: S. Michael Benson, Highland; Richard Cwiakala, Wappingers Falls; Mark J. Fantacone; Jeffrey D. Haggar, both of Poughkeepsie; Dennis D. Koren, Fishkill; Allan S. Merritt, Poughkeepsie, all of N.Y.; Michael Schulte, Tübingen, Fed. Rep. of Germany; Harry M. Yudenfriend, Wappingers Falls, N.Y.

[73] Assignee: International Business Machines Corp., Armonk, N.Y.

[21] Appl. No.: 676,603

[22] Filed: Mar. 28, 1991

[51] Int. Cl.⁵ .............................................. G06F 13/00
[52] U.S. Cl. ...................... 395/600; 395/275; 395/700; 364/284.2; 364/242.94; 364/242.95; 364/DIG. 1
[58] Field of Search ............... 395/600, 275, 700, 650

[56] References Cited

U.S. PATENT DOCUMENTS

| 4,646,229 | 2/1987 | Boyle | 395/600 |
| 4,809,170 | 2/1989 | Leblang et al. | 395/700 |
| 4,815,076 | 3/1989 | Denney et al. | 371/11 |
| 5,014,193 | 5/1991 | Garner | 395/275 |

FOREIGN PATENT DOCUMENTS 2189061 10/1987 United Kingdom.

Primary Examiner—Thomas C. Lee
Assistant Examiner—Burch Harper
Attorney, Agent, or Firm—William B. Porter

[57] ABSTRACT

An installation creates a source I/O definition file (IODF), defining a current system I/O configuration, and a target IODF, defining a future I/O configuration. An activate function is initiated to change the system's hardware and software definition to correspond to the target IODF. A compare function compares the source and target IODFs, and creates a Configuration Change Block (CCB) to efficiently drive the change process. A validation function validates that the proposed change is valid, and the change process updates the hardware and software configuration definitions. If the change process is successful, a notification is sent; if not, a backout process restores the I/O configuration to its initial state.

6 Claims, 22 Drawing Sheets

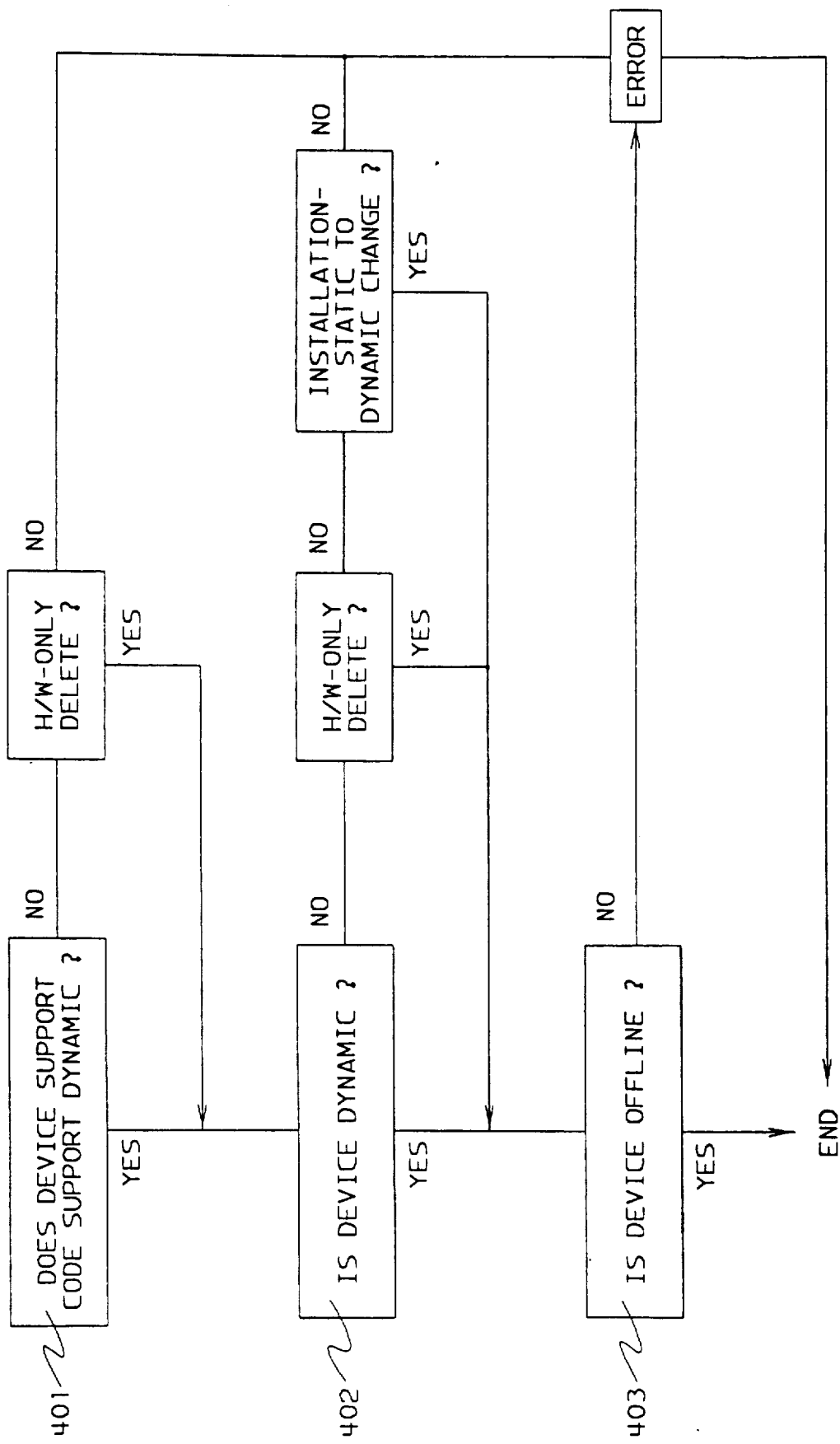

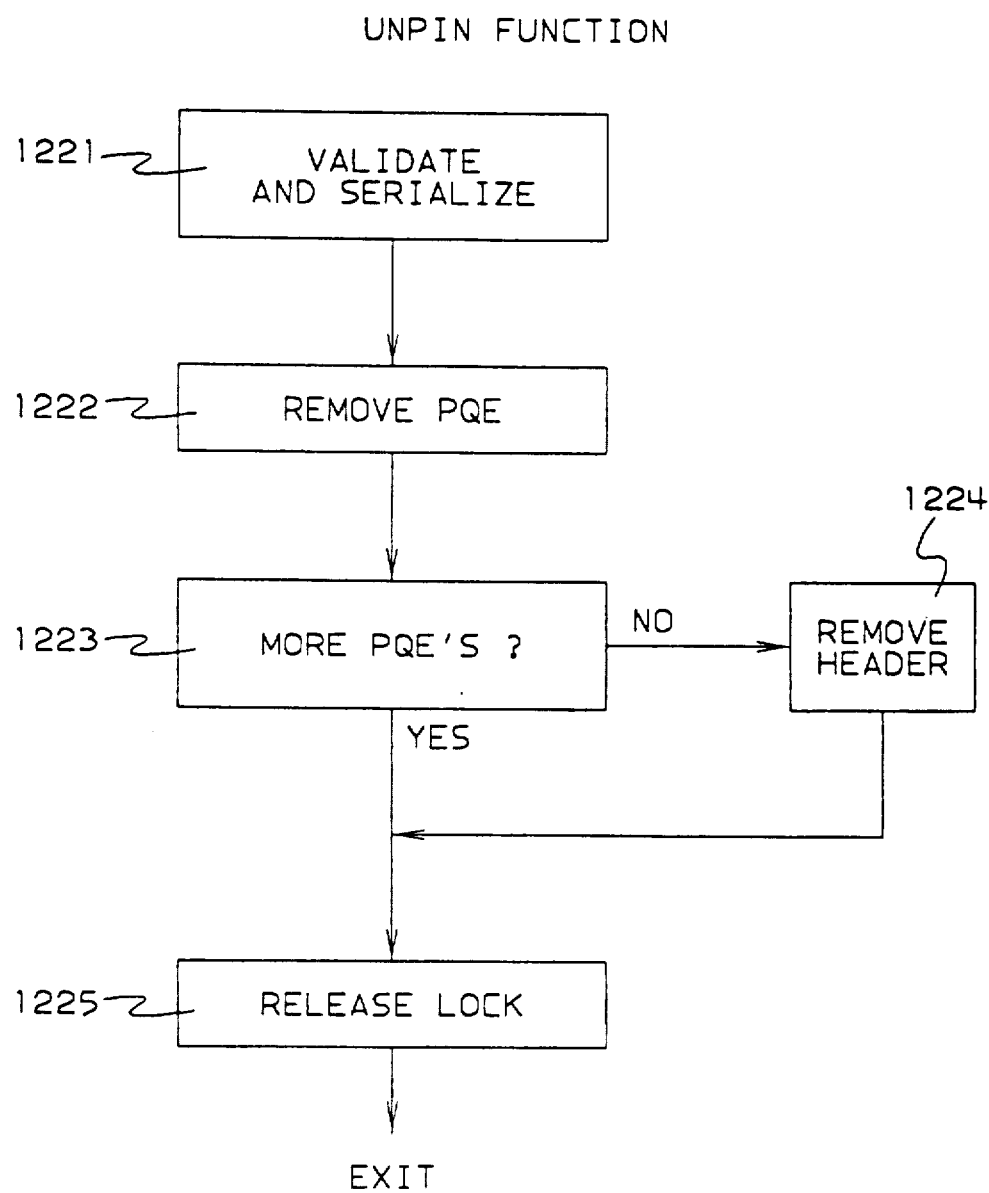

SYSTEM FOR DYNAMICALLY CHANGING A SYSTEM I/O CONFIGURATION BY DETERMINING DIFFERENCES BETWEEN CURRENT AND FUTURE CONFIGURATIONS AND DESCRIBING DIFFERENCES TO SOFTWARE AND HARDWARE CONTROL BLOCKS

BACKGROUND OF THE INVENTION

1. Field of the Invention

This invention relates to the field of I/O reconfigurable data processing systems. More specifically it relates to the making of changes to the input/output (I/O) configuration of such a system with minimal disruption to the system's operation.

2. Background Art

Data processing systems in the field of art of the present invention typically comprise a central processor complex attached to one or more control units and their associated I/O devices in an I/O subsystem (or with other processor complexes), and central storage; and the CPU further comprises an Arithmetic Logical Unit (ALU), registers, high speed buffers, and the Processor Controller. Such systems are typically managed by a control program such as IBM's MVS/ESA.

Since such a system has a high degree of modularity, it is a routine event to add, delete, or exchange control units, I/O devices, or change channel path configurations, in the system. A particular I/O configuration must be defined both to the system's channel subsystem and operating system software, and a change to an I/O configuration occasioned by the addition, deletion, or exchange of an I/O device must reflected in a change to the hardware and software definition.

In the past it has been a matter of some difficulty to change a system's I/O configuration without disrupting active processing or the system. A normal course of events would be to establish a new set of definitions, stop processing of work on the system, add, delete, or change the devices and controllers by performing the physical connection, disconnection, or reconnection, then power on reset (POR) the hardware and initial program load (IPL) the operating system to reestablish the correct hardware and software definitions, and again start the processing of work.

This was recognized to be unacceptably disruptive and expensive, requiring as it does that the system be idle for a possibly long time period while the reconfiguration is performed. Therefore, schemes were devised to reduce the impact on system processing: one such scheme involved "over-defining" an I/O configuration—i.e., setting up definitions (control blocks) for nonexistent (at present) devices, which could then be utilized later when new devices are added. However this scheme has its limitations: the number of reserved definitions is a largely matter of intelligent guess work; space is wasted by the reservation of the unused control blocks; the scheme allows for the addition, not the deletion of device definitions; and certain types of changes (such as the incorrect specification of device's "type") still required a system reinitialization.

Other schemes provided for the dynamic addition of a device definition without pre-reservation of control blocks, but did not deal with device definition deletion since deletion poses the additional problem of the treatment of ongoing system work making use of the device to be deleted—again, the traditional method of dealing with this situation was to "quiesce" the system (completing ongoing work without starting new work) so that the device could be disconnected, and device definition deleted, without adversely affecting ongoing processing. Still other schemes dealt with changing the characteristics of existing device definitions again leaving unresolved the matter of whether or not active work must stop, and how to deal with device additions, or deletions.

SUMMARY OF THE INVENTION

This invention describes the basic process for dynamically changing the definition of a system's I/O configuration, as that definition is known to the I/O subsystem (the hardware), and the operating system (the software).

In operation, a program creates a file defining the "current" state of the system I/O configuration-related control blocks in dynamically modifiable storage. A program then creates a "future" I/O configuration file (which may, in fact, be a previous configuration). When it is desired to change the system definition to the "future" configuration, a comparison function compares the two configuration definitions and creates a configuration change block representing the changes necessary to make an efficient transformation to the hardware and/or software definition control blocks as necessary, and a completion signal is generated for dependent processes. In updating the hardware control blocks, a "grouping token" is used to insure efficient storage use.

It is an object of this invention to provide a mechanism for dynamically changing either or both the hardware and software I/O configuration of a data processing system with guaranteed data integrity.

It is a further object of this invention to provide for the creation of a single I/O configuration definition usable for creating both a hardware definition and a software definition.

It is a further object of this invention to provide an efficient mechanism for migrating a system from a first I/O configuration to a second I/O configuration.

It is still a further object of this invention to provide for validation that a transition from a first configuration definition to a second configuration definition is permissible.

BRIEF DESCRIPTION OF THE DRAWINGS

FIGS. 4A, 4B, 4C, and 4D are flowcharts for respectively: validating a device deletion, validating a device addition; validating a device-path addition, and validating a device path deletion.

FIG. 12B is a flowchart showing the UNPIN function.

DESCRIPTION OF THE PREFERRED EMBODIMENT

Figure 1A:
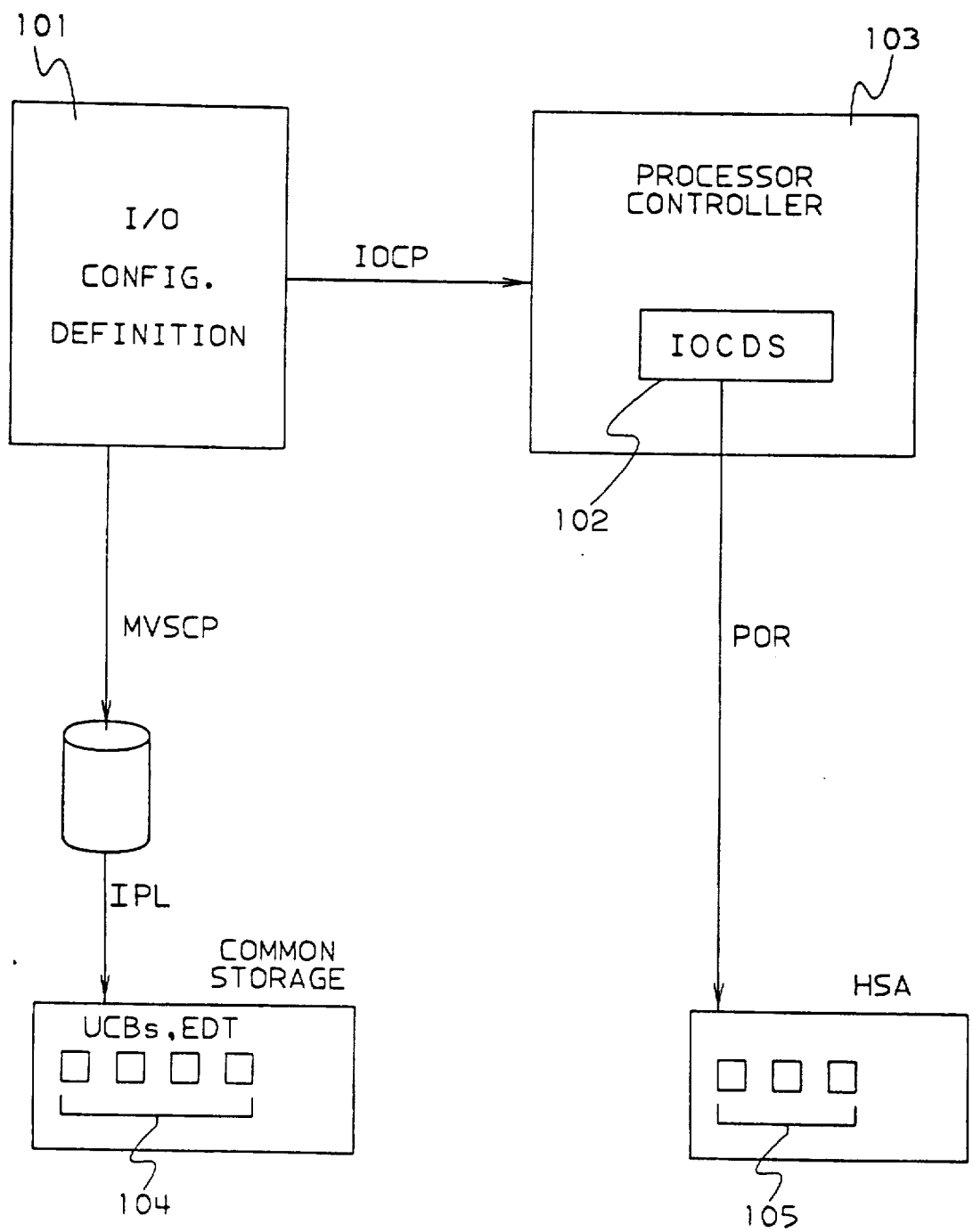
FIG. 1A is a prior art block diagram illustrating an existing system configuration definition mechanism.

FIG. 1A illustrates at a high level the configuration definition mechanism of IBM's prior art Systems. An I/O Configuration Definition 101 is processed by a hardware I/O configuration program (IOCP) to create an I/O Configuration Data Set (IOCDS) 102 within the Processor Controller 103. Independently, the same (or a different) I/O Configuration Definition 101 is processed by the Multiple Virtual Storage (MVS) Configuration program (MVSCP) and selected at system IPL to create control block definitions of the configuration (104) in control program (common) storage. The IOCDS 102 is used at hardware Power-on reset (POR) to generate definitional structures within the system's Hardware System Area (HSA) Storage.

Figure 1B:
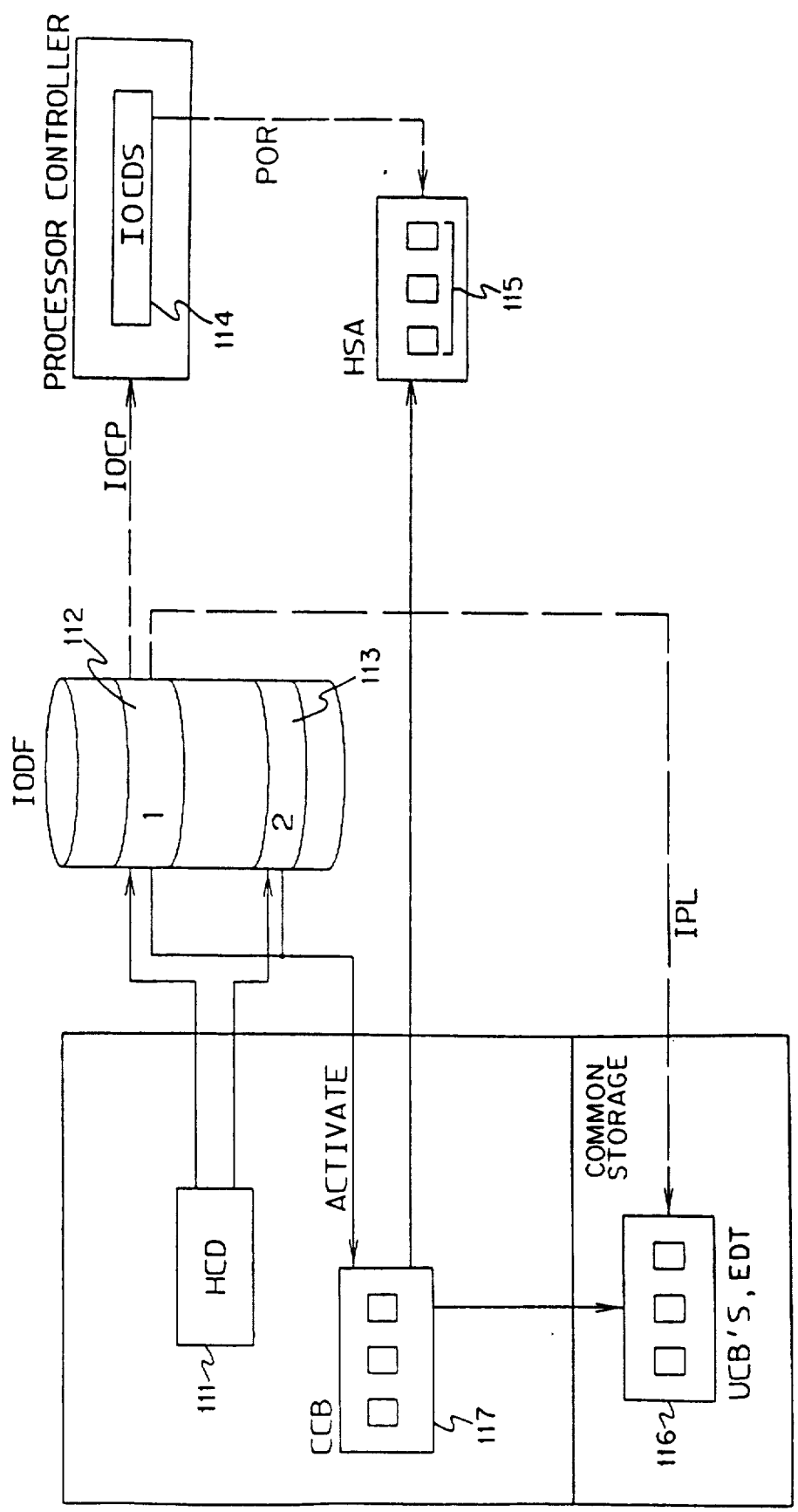
FIG. 1B is a block diagram of the system configuration mechanism of the present invention.

FIG. 1B illustrates at a high level the improved configuration definition mechanism of the present invention, in an IBM/MVS embodiment. A configuration defining program (Hardware Configuration Definition HCD) 111 creates a representation of the current system I/O configuration 112 in an I/O definition file (IODF), and, subsequently, a representation of a future configuration in the same (or a different) file 113. (Appendix B describes the IODF layout in more detail, in relation to FIG. 17—which illustrates it.) The current configuration definition 112 may be used, as in prior art systems, to create an IOCDS 114 (in the processor controller)—which then is processed at POR to create definitional structures 115 within HSA. Definition 112 may also be used, again as in prior art, to create control block definitions 116 within common program storage. Subsequently, an ACTIVATE function initiates a comparison between current definition 112 and future definition 113, the creation of a Configuration Change Block (CCB) 117 representing the deltas to the hardware and software definitions to perform the change (and validates that the change can be made with data integrity). The CCB then drives the modifications needed to software definition 116 and hardware definition 115. (The mechanics of the changing of the hardware definition are described in "Dynamically Changing a System I/O Configuration Definition" by R. Cwiakala et al., Ser. No. 07/693,997, U.S. Pat. No. 5,170,472 filed on the same date as the present invention and assigned to the same assignee, which application is hereby incorporated by reference.) This process will be explained in more detail below.

Processing Overview

Figure 2:
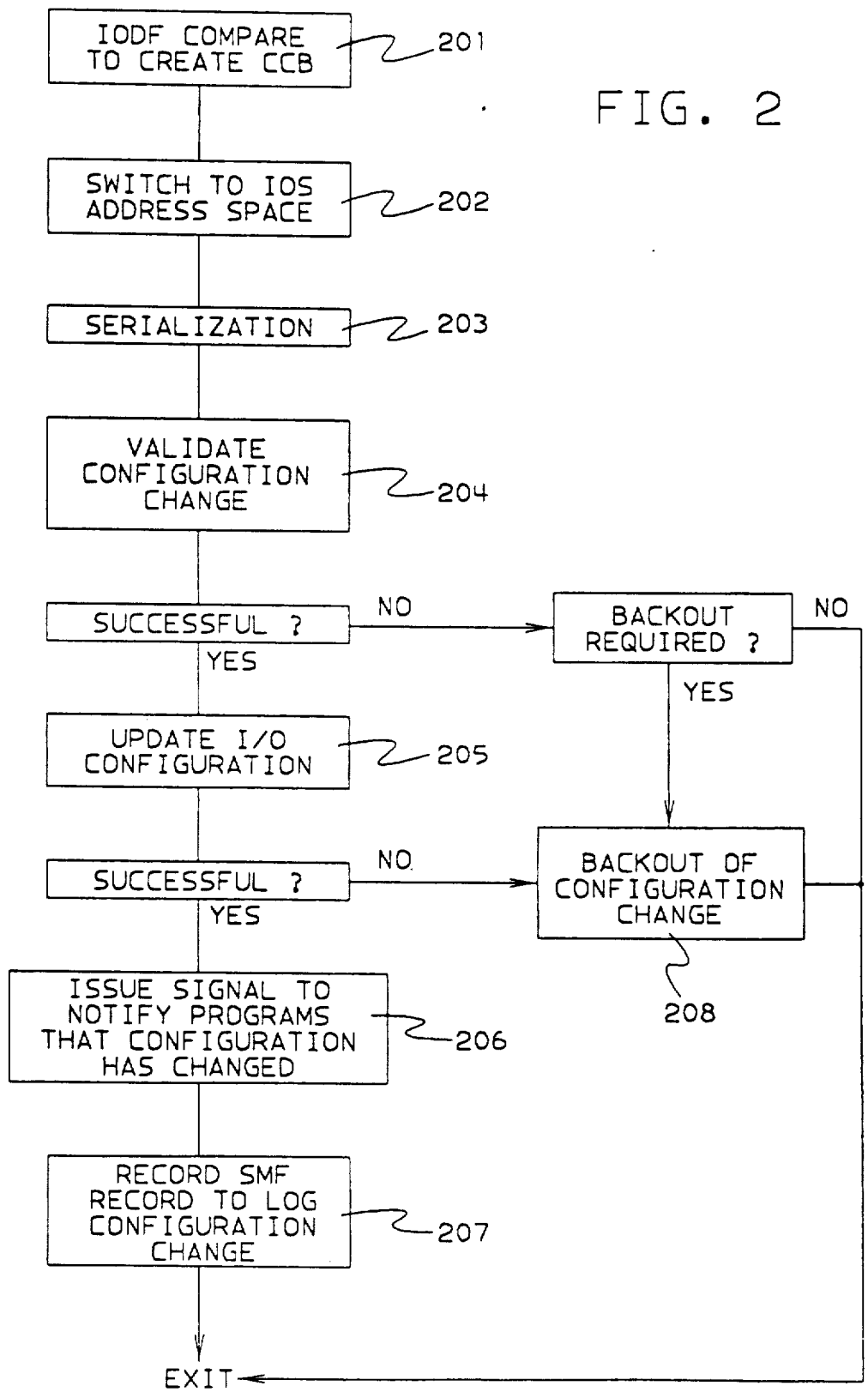
FIG. 2 is a flowchart presenting an overview of the dynamic I/O configuration process of the present invention.

An overview of the dynamic I/O configuration process used in changing from a current configuration to a future (target) configuration is as follows, and is illustrated in FIG. 2.

1. The user initiates a configuration change via the activate function in the HCD. The information that the user may specify on the activate request includes the following.

Target IODF, which is the IODF that contains the I/O configuration definition to which the user wishes to change.

EDT ID, which identifies the data in the target IODF which will be used to construct the new EDT (the "eligible device table", a control block known to the prior art).

Whether a software-only configuration change should be performed.

Whether the test function should be performed.

Whether an IOCDS should be created.

Whether the written IOCDS should be made the default at the next POR.

2. The source IODF, which is the IODF that contains the I/O configuration definition with which the system is currently running, and the target IODF are compared 201 in order to create the CCB. (Part of the I/O configuration comparison process is the enforcement of the implementation restriction that a split or a merge of the LCU (Logical Control Unit) does not occur as a result of the planned I/O configuration change. Refer to Appendix C for a detailed description.) This creation process is described further in FIG. 8 and the accompanying text below.

3. MVS switches to the input/output subsystem (IOS) address space 202 to perform the configuration change. The MVS address space in which the IODF comparison processing is performed is a time sharing option (TSO) address space. A TSO address space is terminated if the user logs off to TSO. To ensure that the configuration change runs to completion, MVS switches to the IOS address space to perform the configuration change. The IOS address space is an address space which cannot be terminated by the user.

4. MVS obtains the necessary serialization 203 to perform the configuration change. MVS must serialize with other processes that can affect an I/O configuration change. Specifically, MVS:

enqueues on the dynamic resource, to prevent another dynamic configuration change from occurring enqueues on the reconfiguration resources, to prevent reconfiguration (i.e. vary on-line and vary off-line) of devices and device-paths enqueues on the Dynamic Device Reconfiguration (DDR) resources, to prevent a DDR swap enqueues on the allocation TP resource to prevent allocations to off-line TP and CTC devices serializes via a compare and swap on the Missing Interrupt Handler (MIH) resource, to prevent updates to MIH time intervals.
5. MVS then verifies 204 that the configuration change is valid. This process is described further in FIGS. 3, 4A, 4B, 4C and 4D, and the accompanying text below.
6. If the validation is successful, the hardware and software representations of the I/O configuration are updated 205 to reflect the new I/O configuration definition. This process is described further in FIG. 6 and the accompanying text below.
7. If the hardware and software were updated successfully, MVS issues a signal 206 to notify programs that the configuration change has completed successfully. (This signal-together with the one issued at step 307 of FIG. 3—provide the opportunity for system components, subsystems, and applications (that wish to listen for it) to prepare before or react after a dynamic configuration change is done and to adjust internal tables that they maintain.) Additionally, information regarding the configuration change is recorded 207 for logging purposes.
8. If the hardware and software were not updated successfully, MVS backs out of the configuration change 208 to restore the I/O configuration to its original state.

Validating a Configuration Change

Figure 3:
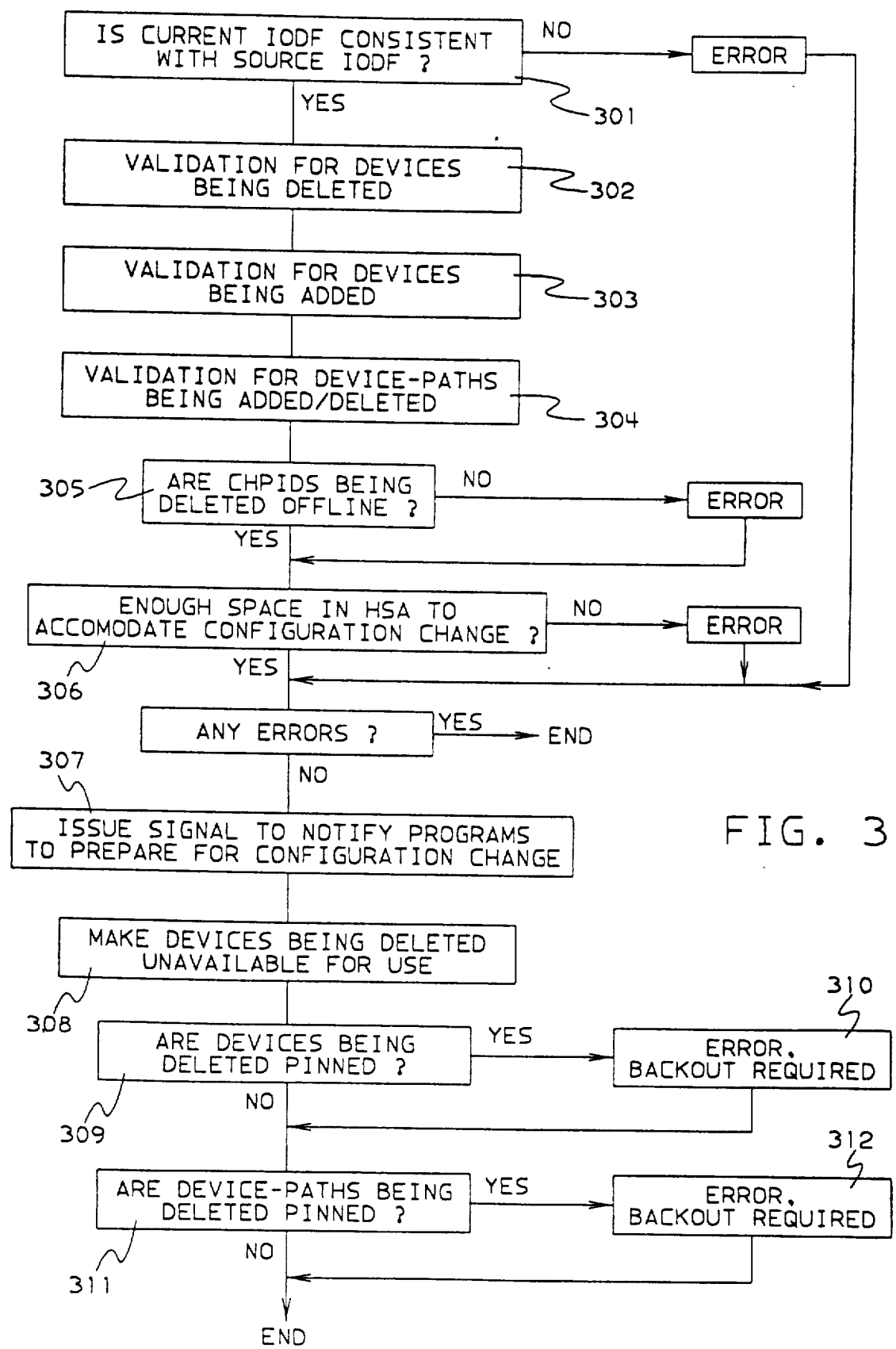
FIG. 3 is a flowchart for validating a configuration change.

The validation phase is outlined in FIG. 3. The steps which require more detail are described in FIGS. 4A, 4B, 4C and 4D.

Referring first to FIG. 3, MVS validates that:

The source I/O Definition File (IODF), which is the IODF used as the base for configuration changes, matches the configuration definition in HSA with which the system is currently running (FIG. 3 at 301).

Figure 4B:
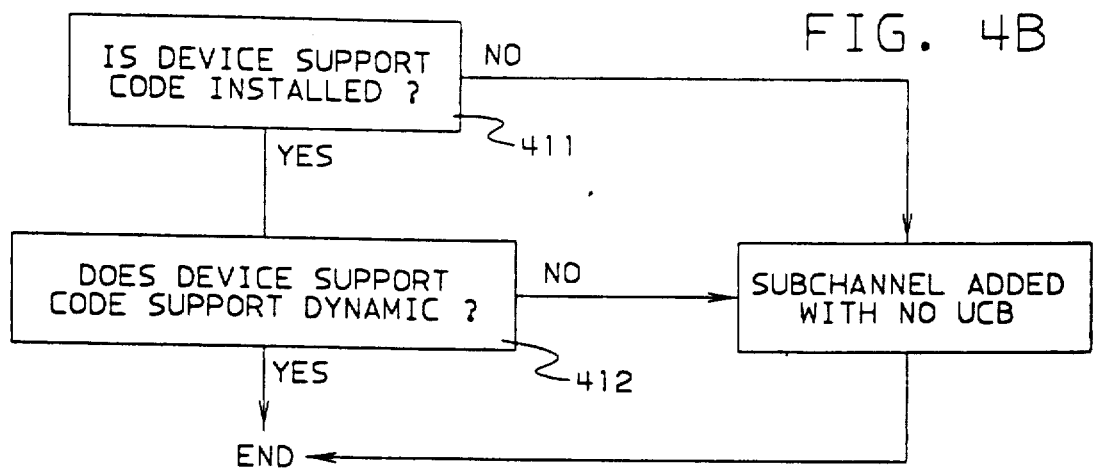
Figure 4C:
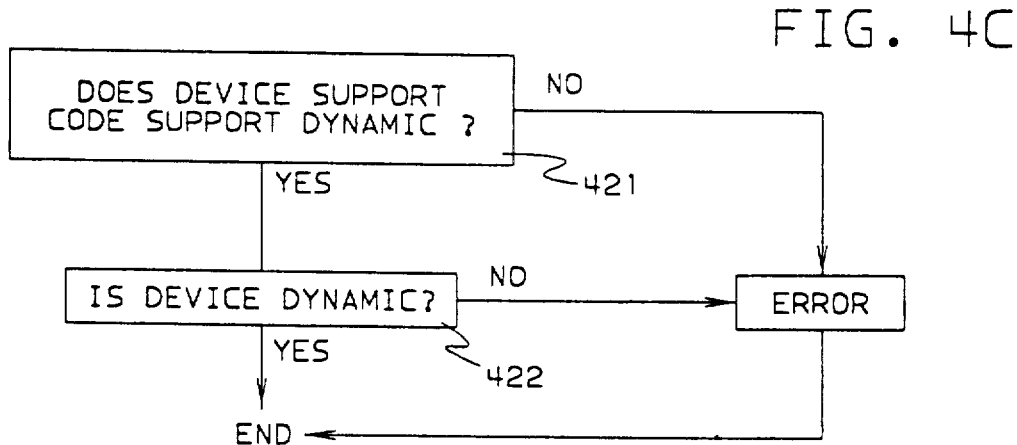
Figure 4D:
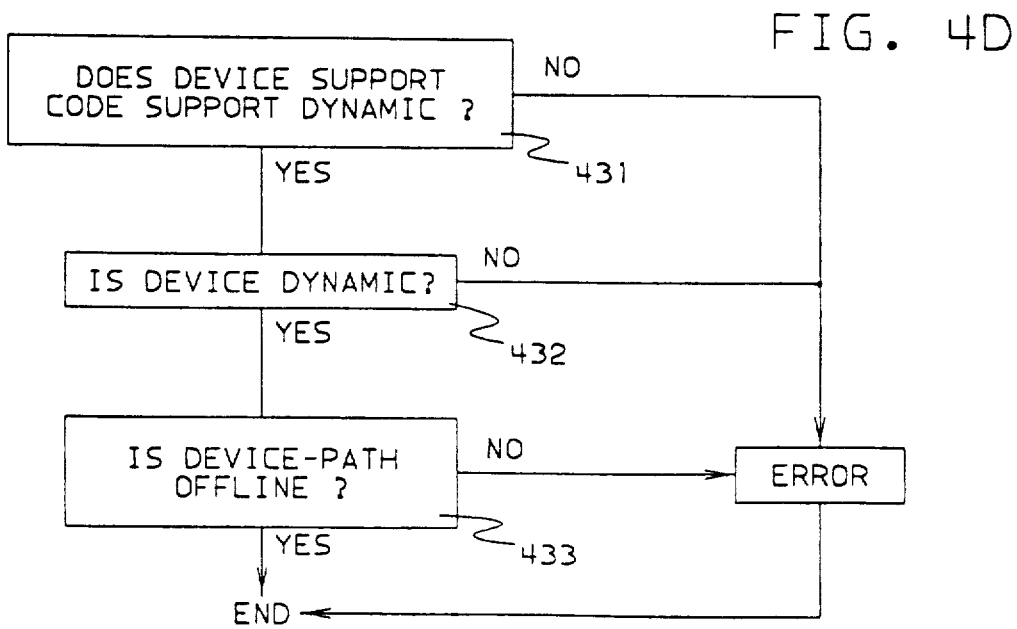

For each device 302 being deleted:
  The device support code supports dynamic (FIG. 4A at 401). (See the discussion of "Static" and "Dynamic" devices below.)
  The device is defined as dynamic (FIG. 4A at 402). One exception to this rule is when the device is being changed from installation-static to dynamic. This transition is allowed if and only if the only difference between the source IODF definition and the target IODF definition (for the device) is that the source indicates that the device is defined as installation-static and the target IODF has the device defined as dynamic. In this case, the installation-static UCB is left in the old data structure, since there is no way to safely remove it from the UCB chain without jeopardizing system integrity—but it is rendered functionally invalid. A new dynamic UCB is added.
  Another exception to this rule is when only the subchannel is being deleted and not the UCB (hardware-only delete). In this case, the subchannel is allowed to be deleted regardless of whether the device support code supports dynamic or the device is defined as dynamic.
  The device is off-line (FIG. 4A at 403).
For each device being added 303:
  The device support code was loaded at IPL (FIG. 4B at 411).
    In prior art systems, MVS only loaded the device support code for devices in the I/O configuration at IPL. In accord with the present invention, the installation may indicate that all device support code for device types which support dynamic should also be loaded at IPL. Selecting this option will ensure that any device type which supports dynamic can be dynamically added.
  The device support code supports dynamic (FIG. 4B at 412).
  If either or both of these conditions are not met, the device is allowed to be added to the hardware definition. A subchannel is created (if not a software-only configuration change) but a UCB and other device related control blocks are not created. The device is available for use at the next IPL of the same IODF at which time the software definition is created.
For each device-path being deleted 304:
  The device support code supports dynamic (FIG. 4D at 431).
  The device is defined as dynamic (FIG. 4D at 432).
  The device-path is off-line (FIG. 4D at 433).
For each device-path being added 304:
  The device support code supports dynamic (FIG. 4C at 421).
  The device is defined as dynamic (FIG. 4C at 422).
For each channel path being deleted, the channel path must be configured off-line 305.
If the configuration change is not a software-only change, the system validates that there is enough space in the Hardware System Area (HSA) 306 to accommodate updates to the hardware I/O configuration.

All of the above validation steps are processed even if there are any requests which do not pass validation, to give the user as much information as possible as to why the configuration change could not be processed.

If the configuration change is valid so far (No errors were encountered), the system will do the following:
Issue an Event Notification Facility (ENF) signal 307 to notify programs to prepare for the configuration change. For example, programs which are using a device that is to be deleted, must prepare for the device to be deleted, by removing the address of the UCB associated with the device from any control blocks, unpinning the UCB (see below), etc.
Similarly, a device support code exit called the Device Services Exit (DSE) is invoked to notify device support code to prepare for the configuration change (for example, the device support code may need to free storage used as work areas for that device).
Make all devices which are to be deleted unavailable to be used for I/O requests 308, by disabling the subchannel associated with the device and boxing the device. Disabling the subchannel prevents I/O interrupts from being presented by the device. Boxing the device prevents I/O requests from being issued to the device.
Validate that all devices to be deleted are not pinned 309. If a device is not pinned, the UCB associated with the device is marked "not findable", which prevents if from being used. Pinning is a serialization technique that can be used by a program to prevent a UCB and associated device from being deleted by a dynamic I/O configuration change. If any devices to be deleted are pinned, an error is indicated and backout is required 310. (See FIG. 7 and supporting text.)
Validate that all device-paths to be deleted are not pinned 311. If a device-path is not pinned, the associated UCB is marked "not path-pinnable", to prevent the device-paths associated with the UCB from being pinned. Pinning device-paths is similar to pinning a UCB, except that pinning device-paths prevents the device-paths from being deleted, as well as preventing the UCB and associated device from being deleted. If any device-paths to be deleted are pinned, an error is indicated and back-out is required 312. (See FIG. 7 and supporting text.)

Updating the Configuration Definition

Figure 5:
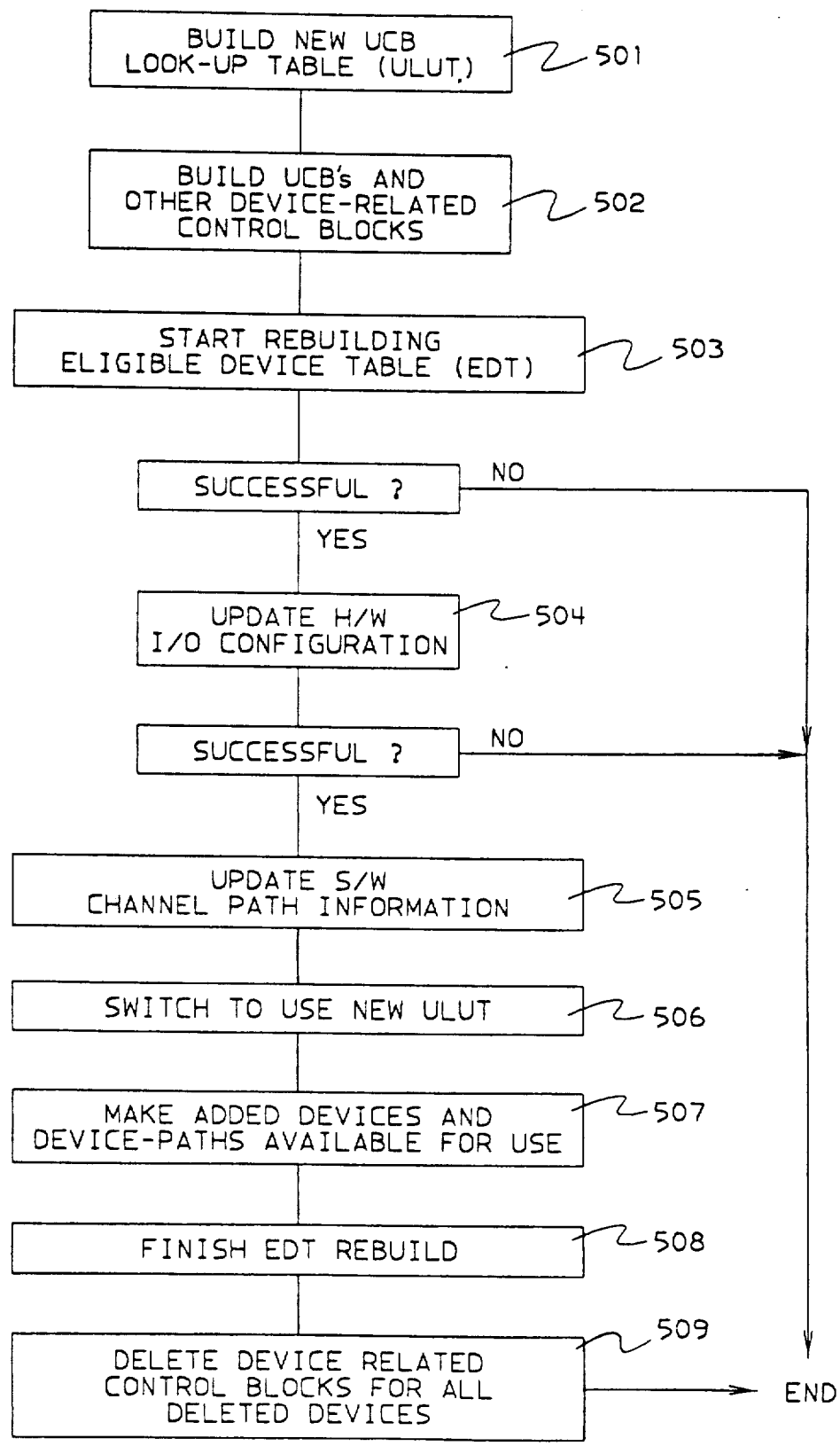
FIG. 5 is a flowchart for updating an I/O configuration.
Figure 6:
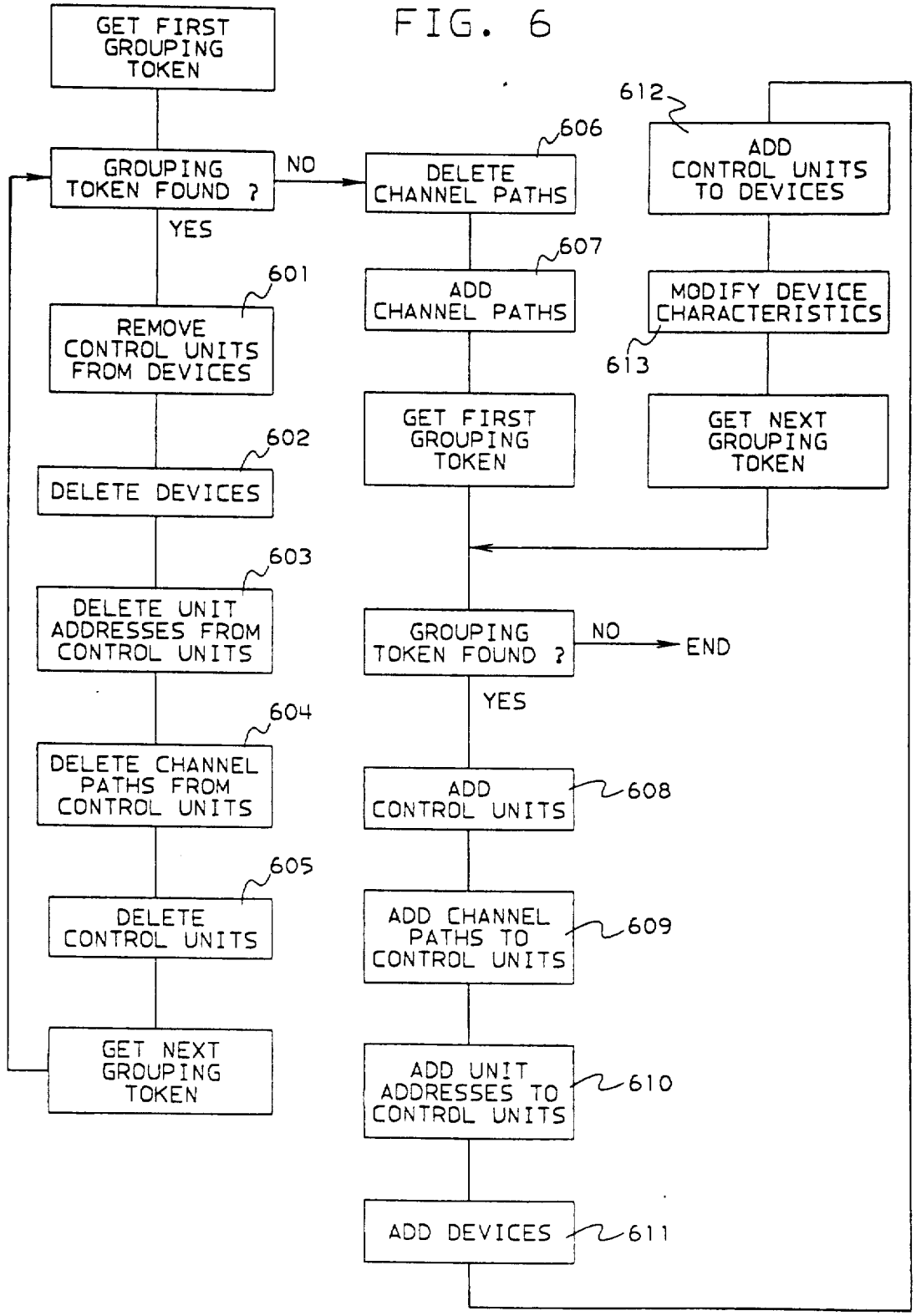
FIG. 6 is a flowchart for updating a I/O hardware configuration.

If the configuration change is valid (no errors were encountered during the validation phase), the I/O configuration is updated as shown in FIG. 5 and FIG. 6.

A new UCB Lookup Table (ULUT) is built (FIG. 5 at 501). The ULUT contains pointers to all UCBs in the system. The new ULUT will contain entries for the UCBs being added and will not contain entries for the UCBs being deleted.

A new UCB is built 502 for each device being added to the software I/O configuration. Additionally, other device related control blocks like the Device Statistics Table (DST), which is used to maintain error data associated with a device, are built. A Measurement Block Index (MBI) is established for certain added UCBs (e.g. DASD or TAPE), which will allow performance data to be measured for the device. The default MIH time interval for the device class with which the UCB is associated, is established for each added UCB, so that missing interrupts will be detected for the device.

The EDT rebuild process is started 503. This first stage of EDT rebuild creates a new intermediate EDT which will not contain the UCBs being deleted. If stage one EDT rebuild is unsuccessful, an error is indicated, back-out is required, and the update process is exited. Otherwise, the update process continues.

The hardware I/O configuration is then updated 504. This process is further described in FIG. 6. I/O components are updated in a specific order and by grouping token. The grouping token is a means for grouping together changes to I/O components, to minimize the HSA storage used for the constructs which represent the I/O components. All devices and control units in the same Logical Control Unit (LCU) will have the same grouping token. An LCU is a hardware entity, and is made up of a set of control units and devices, such that the control units access the same set of devices. (It is a set of control units having devices in common.) The following describes the order in which hardware I/O components are updated.

For each grouping token associated with the configuration change, the hardware I/O components are updated in the following order.

Remove control units from devices (FIG. 6 at 601).
Delete devices 602.
Delete unit addresses from control units 603.
  Delete channel paths from control units 604.
  Delete control units 605.
Then, all requests to delete channel paths are performed 606, followed by all requests to add channel paths 607. The order in which channel path configuration changes are performed is not governed by grouping tokens. Channel paths are not part of the LCU structure, therefore grouping tokens provide no HSA storage efficiency benefit for channel paths.

Then, for each grouping token associated with the configuration change, the remaining configuration changes are performed in the following order.
  Add control units 608.
  Add channel paths to control units 609.
  Add unit address ranges to control units 610.
  Add devices 611.
Add control units to devices 612.
  Modify device characteristics 613.

The above order must be followed because before an I/O component can be deleted, all I/O components lower in the hierarchy must be deleted. That is, before a channel path can be deleted, all control units attached to it must be deleted. Before a control unit can be deleted, all devices attached to the control unit must be deleted. Similarly, before an I/O component can be added, all I/O components higher in the hierarchy must be added. That is, before a device can be added, all control units that the device will attach to must be added. Before a control unit can be added, all channel paths that the control unit will attach to must be added. The CCB creation logic guarantees this.

If a change to update an I/O component is unsuccessful, an error is indicated, back-out is required, and the hardware update process is exited. Otherwise, the hardware update process continues. If the hardware update process completes with no errors, the I/O configuration update process continues.

Returning to the flow in FIG. 5, channel path information that is maintained by the system is then updated 505 to include information about added channel paths, and remove information about deleted channel paths.

The ULUT lock is obtained to serialize updates to the ULUT and MVS I/O configuration token. The old and new ULUTs are then switched 506, making the new ULUT the current ULUT. From this point on, backing out of the configuration change is not possible, because once the new ULUT is made the current ULUT, UCBs that have been added are available for use, and cannot be taken away by back-out. The MVS I/O configuration token is updated (see the description of this token in the detailed description of FIG. 11 below; the updating done here is of the sequence number; WWUV; operating system ID; etc.), and the ULUT lock is released.

Devices that have been added are made available for use 507, by simulating a Channel Report Word (CRW) to connect the device to its associated UCB, and make the device available for I/O requests. Similarly deleted devices are disconnected from the UCB.

Device-paths that have been added are made available for use, by simulating a CRW to add the device-paths to the associated UCB, so that the paths are available for I/O requests. For each added device, the associated DSE is invoked to read configuration data from the device and/or perform other device dependent functions.

Stage two, the final EDT rebuild stage, is then performed 508. This stage builds a final EDT containing the complete new configuration, including the UCBs that have been added, and any changes in device grouping and device preference order. The final EDT is built directly from the target IODF.

Lastly, all device-related control blocks for deleted devices are deleted 509. This is not done up front in order to guarantee enough storage for software back-out. That is, if the device-related control blocks for the deleted devices were deleted up front, before the ULUTs are switched, and the configuration change failed, the control blocks would have to be re-added in order to back-out of the configuration change. However, there is no guarantee that there will be enough storage to re-add the control blocks (because the system keeps running, doing production work to the rest of the configuration). Therefore, they are not deleted until back-out is no longer possible.

Backing Out of a Configuration Change

Figure 7:
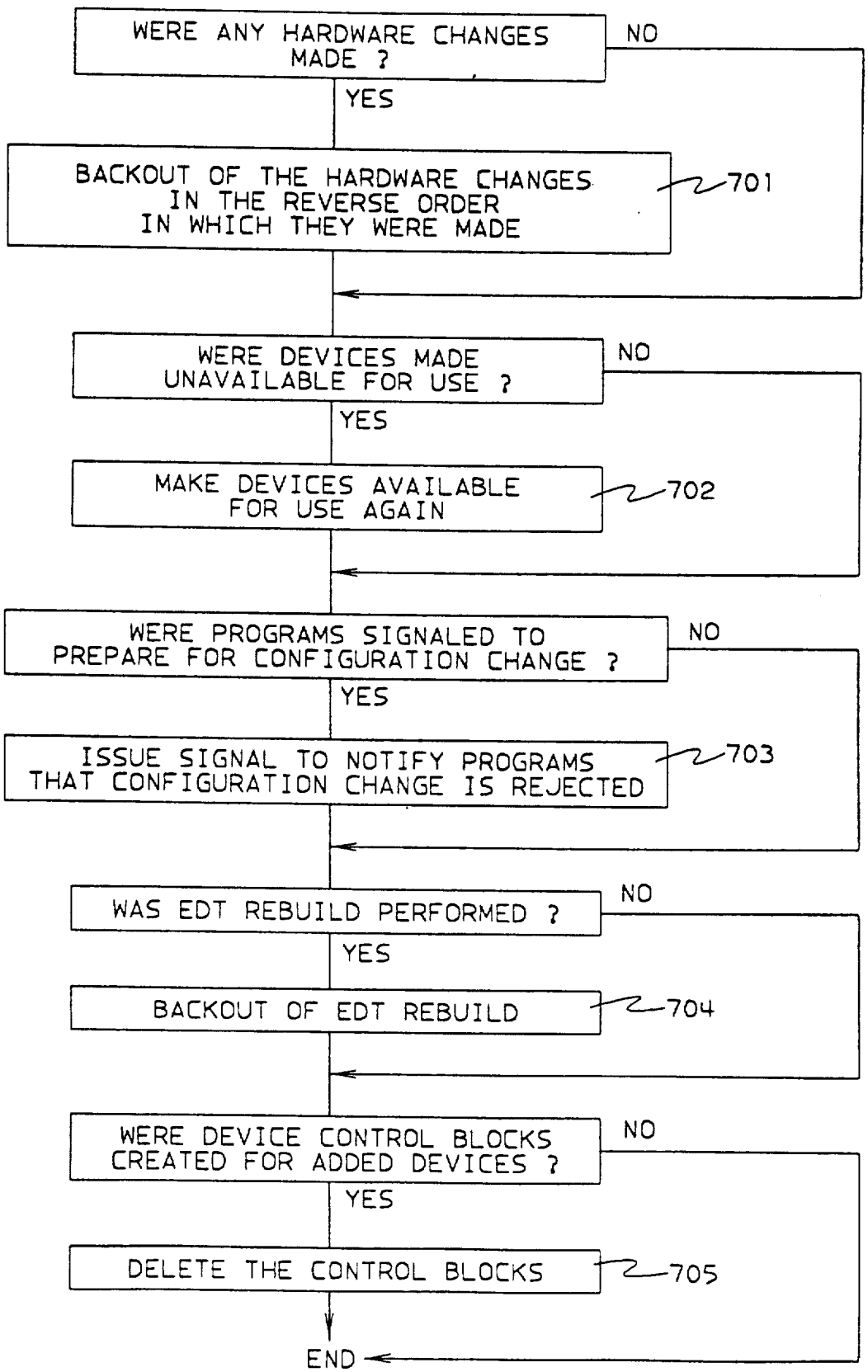
FIG. 7 is a flowchart for backing out of an I/O configuration change.

If the configuration change was unsuccessful (errors were encountered during the validation phase or the update phase), and back-out is required, the configuration change is backed out. The purpose of the back-out is to restore the I/O configuration to its original state before the configuration change was attempted. Back-out processing is shown in FIG. 7.

If any hardware updates were made before the error occurred, the hardware changes are backed out 701. For example, if a device was deleted, it is re-added, if a control unit was deleted, it is re-added, and so forth. Hardware updates are backed out in the reverse order in which they were updated.

All devices which were made unavailable for use are made available for use again 702 by enabling the subchannel and unboxing the device.

If programs were signalled to prepare for the configuration change, a signal is issued 703 to notify the programs that the configuration change is rejected. Programs which had released devices to be deleted can then reuse the devices.

If stage one EDT rebuild was performed, the EDT rebuild process is backed out 704.

All device related control blocks created for devices being added are then deleted from storage 705.

Static, Installation Static, and Dynamic Devices

Because many programs have dependencies on UCBs, this invention introduces the following concepts:
Device types which support dynamic
  This is indicated by the Unit Information Module (UIM) which is a device dependent exit out of HCD (Hardware Configuration Dialog). The UIM defines the device dependent data in the UCB.
Devices which are defined as dynamic.
  For each device whose device type supports dynamic, the HCD user can define the device as installation-static or dynamic.

These new concepts resulted in three software categories of device definitions:
static: the device support code installed for the device type does not support the dynamic capability.
installation-static: device type supports the dynamic capability but the installation designates in the device definition that the device is not allowed to be deleted or modified. This allows the installation to define devices such that they will be accessible to programs which are dependent on the existing static data structures.
dynamic: device type supports the dynamic capability and the installation designates that the device is allowed to be deleted or modified.

In order for a UCB to be eligible for deletion or modification, the device type must support dynamic and the device must be defined as dynamic by the installation.

The following rules help ensure that programs which are unprepared for the dynamic deletion of UCBs (and all associated device-related control blocks) will not encounter unexpected errors.

UCBs for devices defined as dynamic are not accessible to programs which use the prior art programming services for obtaining UCB addresses.

Programs which listen for prior art ENF signals for device related events (e.g. vary device on-line) are not notified of events for devices defined as dynamic. This invention is used in conjunction with a new set of ENF signals for device related events which encompass all UCBs. An ENF signal translation algorithm is used so that the ENF signaller does not have to be sensitive to which devices are defined as dynamic. The ENF signal translation algorithm will do the following:
If device is defined as dynamic, translate signal X into X'.
If device is defined as static or installation-static, issue both signal X and signal X'.

Therefore, existing programs which listen for signal X will only be notified for the event if the UCB is static or installation-static. Programs which listen for signal X' will be notified for the event for any UCB.

CCB Creation

The result of the comparing of the two IODFs shown in FIG. 2 at 201 is the creation of a Configuration Change Block (CCB). The CCB, in turn, is used to drive the changes to the hardware and software configuration definitions.

Figure 8:
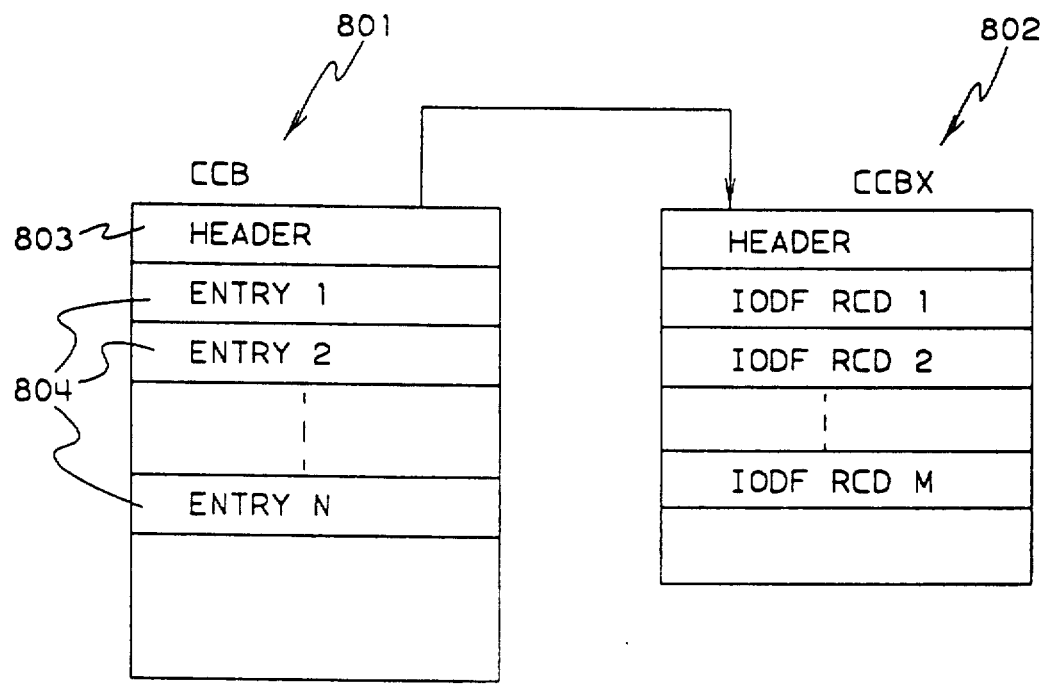
FIG. 8 is a control block diagram illustrating the structure of the CCB and CCBX.
Figure 8:
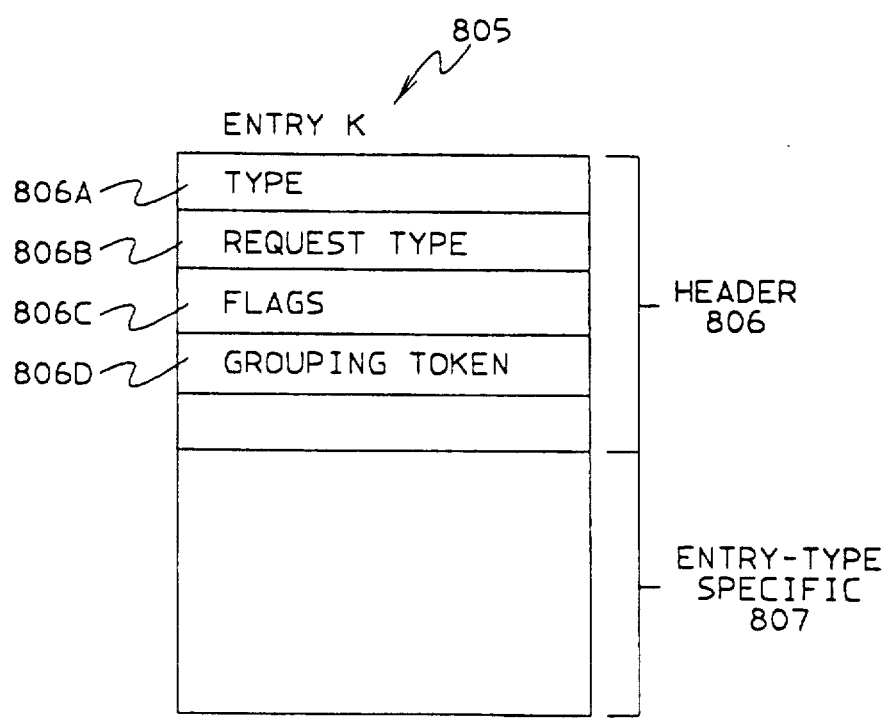

The general structure of a CCB according to the present invention is shown in FIG. 8. As discussed in the preferred embodiment, the CCB actually comprises a CCB proper 801 and a CCB Extension (CCBX) 802 pointed to by an entry in the CCB header 803. The CCB proper contains a series of CCB entries 804 the format of which is further detailed at 805. Each entry contains a header 806 and entry type-specific information 807. The entry header contains a type indication 806A (device, control unit, or channel path ID (CHPID)) indicating the type of configuration change indicated by the entry; a request type indication 806B indicating whether the request is an add, delete or modify request; flags 806C indicating: whether the change is for the hardware configuration definition or software configuration definition; if an installation-static device is being changed to a dynamic device; and if the grouping token is valid. The entry header also contains a grouping token 806D the usage of which will be further detailed below. Each entry further contains type-specific information 807, as illustrated further in FIG. 9 (explained below). The CCBX 802 provides the IODF records that are to be used to control the dynamic additions, deletions, and modifications, and is indexed into by fields in the type-specific CCB entries 807. If the request is to add a component then the CCBX contains the record from the new IODF; if the request is to delete a record then the CCB contains the record from the old IODF (so that the component can be re-added in case of a back-out). (Appendix B describes the IODF in more detail.)

Figure 9:
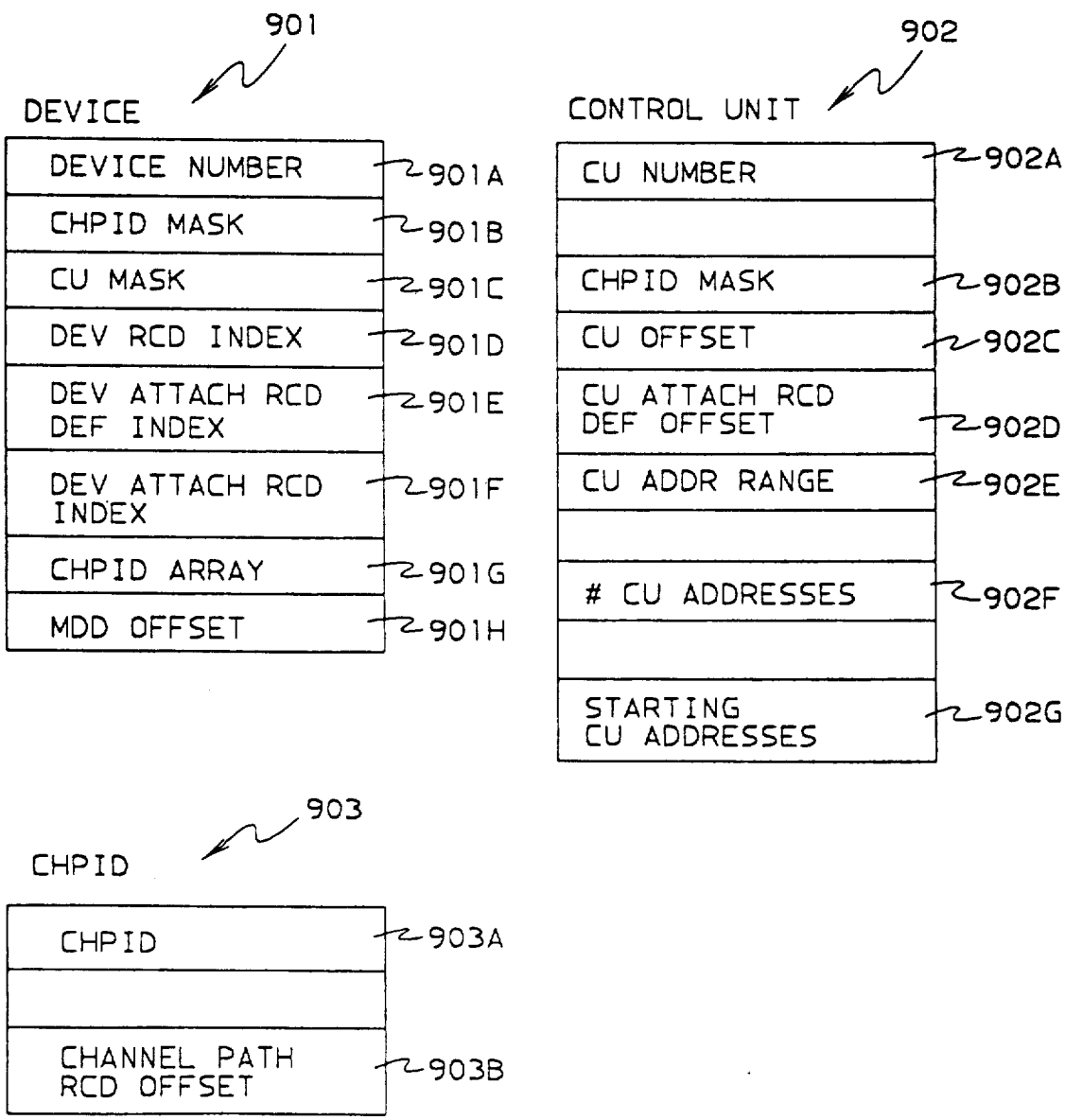
FIG. 9 is a control block diagram illustrating the structure of Device, Control Unit, and Channel Path ID (CHPID) entries of a CCB.

FIG. 9 illustrates the general form of the entry type-specific information in a CCB entry for a device entry 901, a control unit entry 902, and a CHPID entry 903.

Figure 17A:
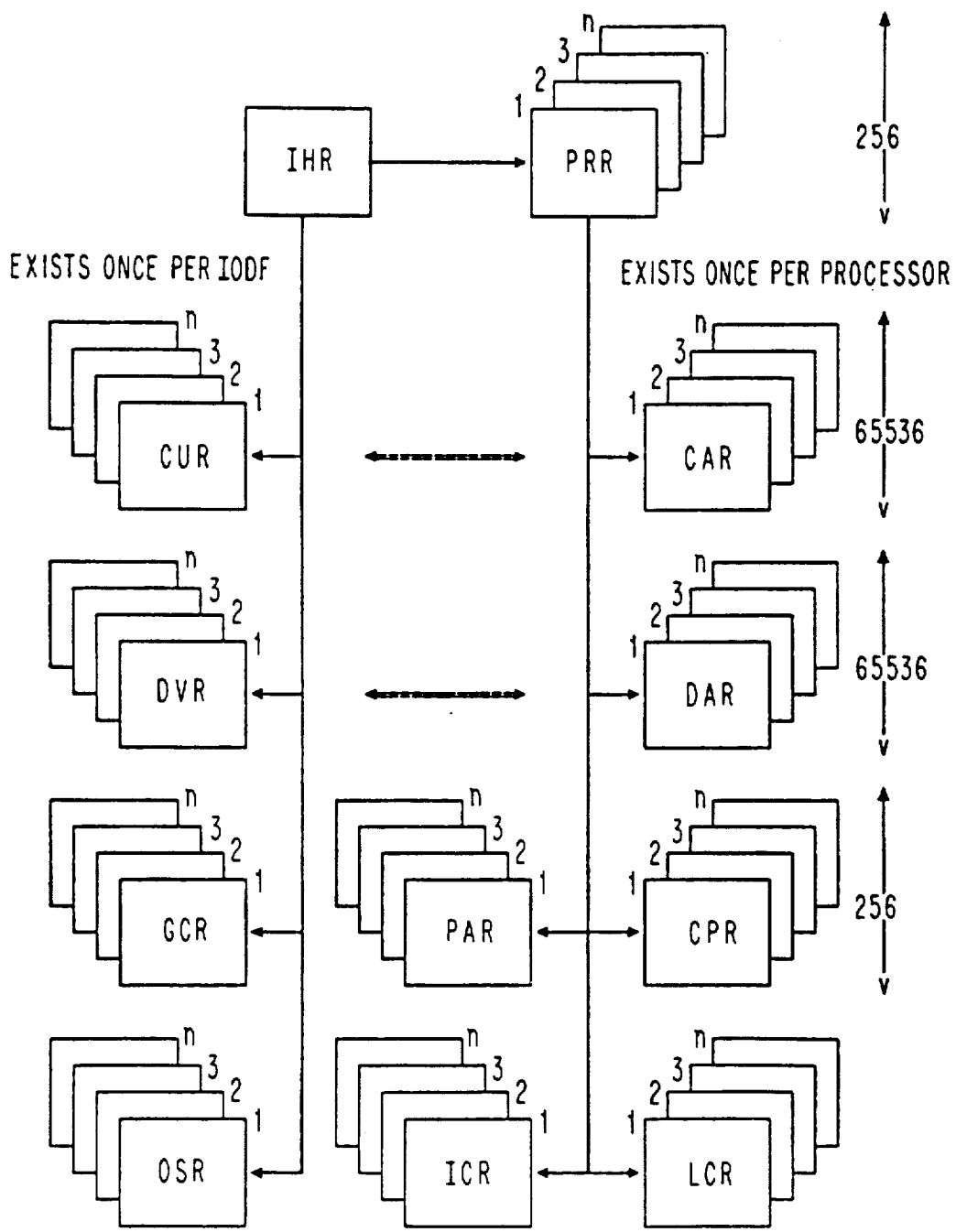
FIGS. 17A and 17B are logical structure diagrams illustrating the structure of the IODF.
Figure 17B:
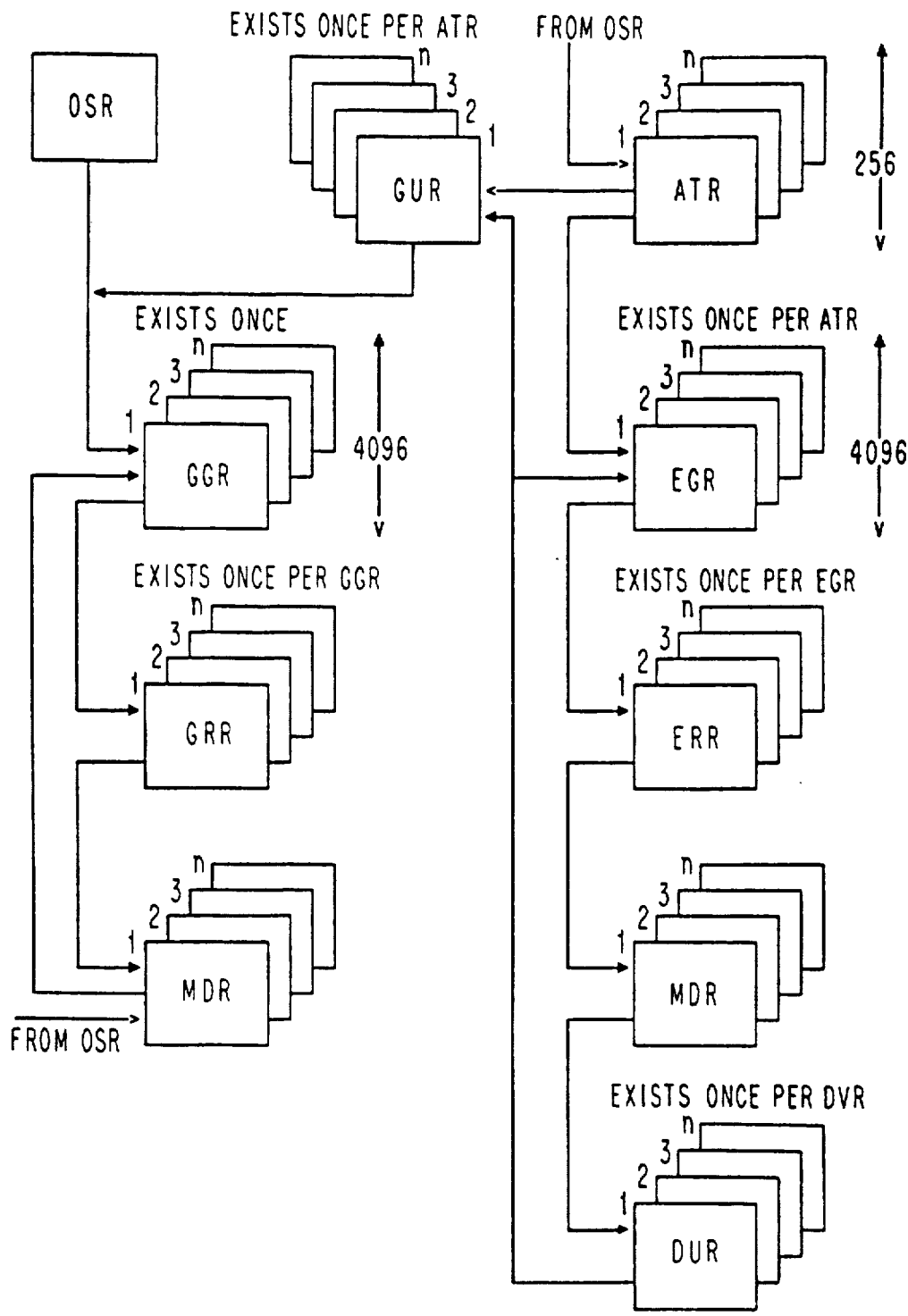

A device entry contains the device number 901A; a mask 901B of CHPIDs contained in the CHPID array 901G that are to be added/deleted from this device if the entry is for a "modify" request to add/remove CHPIDs to/from the device; a mask 901C of physical control unit numbers (contained in IODF DVR record—see FIG. 17A) that are to be added/deleted to/from the device if this entry was made for a modify request to add/delete control units to/from the device; the offset 901D into the CCBX of the device record; the offset 901E into the CCBX of the device attachment record definition (from the IODF DAR); the offset 901F into the CCBX of the device attachment record for the new IODF (from the IODF DAR); the array 901G of CHPIDs that are to be added/deleted from this device if the entry was made for a "modify" request to add/delete CHPIDs to/from the device (obtained from the IODF LCR record); and the offset 901H into the CCBX of the MVS Device Definition (IODF MDR—See FIG. 17B).

A control unit (CU) entry contains the CU number 902A; a mask 902B of CHPIDs that are to be added/deleted from this CU if the entry is for a "modify" request to add/delete CHPIDs to/from the CU (the CHPIDs and link addresses are contained in the CAR record—See FIG. 17A); the offset 902C into the CCBX of the physical CU record (CUR in FIG. 17A); the offset 902D into the CCBX of the CU Attachment Record definition (CAR in FIG. 17A); the range 902E of unit addresses to be added or deleted if the request is to modify the unit address range; a count 902F of the unit addresses in the range; and the starting unit address 902G.

A CHPID entry contains the CHPID 903A, and the offset 903B into the CCBX of the Channel Path Record.

In creating CCB entries, the following overall rules apply:

There are no duplicate entries in the CCB. If the same entry would result out of two different reasons only one entry is generated.

No modify device entries are created if there is one add/delete hardware entry in the CCB for this device.

No modify control unit entries are created if there is one add/delete entry in the CCB for this control unit.

There is one common logic to create follow-up entries. Details are in the section entitled "Follow-up Entry Structure".

The CCB entries are sorted in the following order (so that the data can be conveniently accessed for reporting purposes, and to make building the new ULUT easier)

Device entries in device number order
   delete requests before add requests
   modify requests last
Control unit entries in control unit number order
   delete requests before add requests
   modify requests last
Channel path entries in channel path number order
   deletes before adds.

The following general comments apply to the noted type of CCB entry: (Pseudo-code for the creation of the CCB is contained in Appendix A).

There are two types of CCB entries possible for CHPIDs:
1. delete a CHPID
2. add a CHPID.

Every channel path entry indicates (via the flags in the entry header) that the hardware control blocks are to be updated and the software control blocks remain unchanged.

Delete CHPID CCB Entries: A CCB entry to delete a CHPID is created for the following reasons:

When the old IODF is compared to the new IODF and the CHPID is not found in the new IODF, the CHPID must be deleted from the configuration.

When the old IODF is compared to the new IODF and the CHPID definition has changed, the CHPID must be deleted from the configuration and then re-added.

Add CHPID CCB Entries: A CCB entry to add a CHPID is created for the following reasons:

When the new IODF is compared to the old IODF and the CHPID is not found in the old IODF, the CHPID must be added to the configuration.

When the old IODF is compared to the new IODF and the CHPID definition is found to have changed, both a delete CHPID entry and an add CHPID entry is created. The add entry says to find the corresponding CHPID record in the new IODF and create the CHPID accordingly.

Dependencies on other Entries: Whenever a delete and/or add entry is created for a CHPID, this has dependencies on other entries. See section "Follow-up Entry Structure" for a detailed description of all dependencies.

Control Unit CCB Entries

There are three types of entries possible for a control unit:
1. delete a control unit
2. add a control unit
3. modify the control unit.

Every control unit entry indicates via the header flags that the hardware control blocks are to be updated and the software control blocks remain unchanged.

Delete Control Unit Entries: A CCB entry to delete a control unit is created for the following reasons:

When the old IODF is compared to the new IODF and the control unit is not found in the new IODF, the control unit must be deleted from the configuration.

When the old IODF is compared to the new IODF and the control unit definition has changed (for the exceptions noted as not covered under "Modify"), the control unit must be deleted from the configuration and then re-added.

Add Control Unit Entries: A CCB entry to add a control unit is created for the following reasons:

When the new IODF is compared to the old IODF and the control unit is not found in the old IODF, the control unit must be added to the configuration.

When the old IODF is compared to the new IODF and the control unit definition is found to have changed (for the exceptions noted as not covered under "Modify"), both a delete control unit entry and an add control unit entry are created. The add entry says to find the corresponding control unit record in the new IODF and create the control unit accordingly.

Dependencies on Other Entries: Whenever a delete and/or add entry is created for a control unit, this has dependencies on other entries. See section "Follow-up Entry Structure" for a detailed description of all dependencies.

Modify Control Unit Entries: CCB entries to modify a control unit are created if any of the following conditions are detected:

When the old IODF is compared to the new IODF and a CHPID has been found to be deleted from the control unit definition in the new IODF, a CCB entry is created to indicate that the control unit must be modified to remove the corresponding set of CHPIDs from the control unit definition.

For each control unit that is modified to either add or remove a CHPID, every device on the control unit must also be modified to add or remove the CHPID. The CCB must include a Modify Device entry for each device affected.

When the old IODF is compared to the new IODF and a CHPID has been found to be added to the control unit definition in the new IODF, a CCB entry is created to indicate that the control unit must be modified to add the corresponding set of CHPIDs into the control unit definition. If there are no CHPIDs in common, this exceptional case is not handled by "Modify", but by "Delete" and "Add".

When the old IODF is compared to the new IODF and a unit address has been found to be added or deleted, a CCB entry is created to indicate that the control unit must be modified to add or delete unit address ranges. If there are no unit addresses in common, this exceptional case is not handled by "Modify", but by "Delete" and "Add".

All unit addresses added or deleted are arranged into unit address ranges. There is one modify-entry for every new unit address range added and one entry for every old unit address range deleted.

Device CCB Entries

There are three types of entries possible for a device.
1. Delete a device
2. Add a device
3. Modify the device Each CCB entry for a device may indicate in the header flags that the hardware or software configuration definition is to be updated. This allows for the flexibility to add and delete UCBs without creating or deleting subchannels and adding and deleting subchannels without adding or deleting UCBs.

The following sections describe when these entries are created and placed into the CCB.

Delete a Device: A CCB entry to delete a device is created for the following reasons:
When the old IODF is compared to the new IODF and a device definition in the old IODF (hardware and/or software) is not found in the new IODF, then that device definition must be deleted from the system.
When the old IODF is compared to the new IODF and the device definition has changed, then the device definition must be deleted and then added back into the system (except for the cases defined under "Modify"). Therefore, two CCB entries are created. The first entry will indicate that the device is to be deleted. The second entry indicates that the device is to be created with the new definition.

Add a Device Entry: A CCB entry to add a device is created for the following reasons:
When the new IODF is compared to the old IODF and a device definition (hardware or software) is found in the new IODF that was not contained in the old IODF, then that device definition must be added to the system.
When a device has changed attributes, the device is deleted from the system and must be re-added (except for the cases described under "Modify"). An add device entry is placed into the CCB.

Modify a Device: CCB entries to modify a device are only created when the old IODF is compared to the new IODF and any one of the following conditions are detected:

A control unit is added or removed from a device. If there are no control units in common between the old and new IODFs, then the device is deleted and re-added. Following that are entries to delete or add all paths of the control unit from/to the device.

A path to an existing control unit connected to the device is added or removed.

Illegal status detection setting has changed. (Enabled or disabled)

Interface timeout setting has changed. (Enabled or disabled)

Preferred channel path has changed.

For each of the conditions above, a CCB entry is created to indicate that the device definition must be modified.

All these modify entries are hardware only changes.

Follow-up Entry Structure

Creation of some entries results in a following additional entry of another type or in a change of an existing entry.

For example, when deleting a CHPID this results in an additional entry to modify the control unit to delete the CHPID.

Or when deleting all CHPIDs from a control unit, the entry must be changed to delete the whole control unit.

Figure 10:
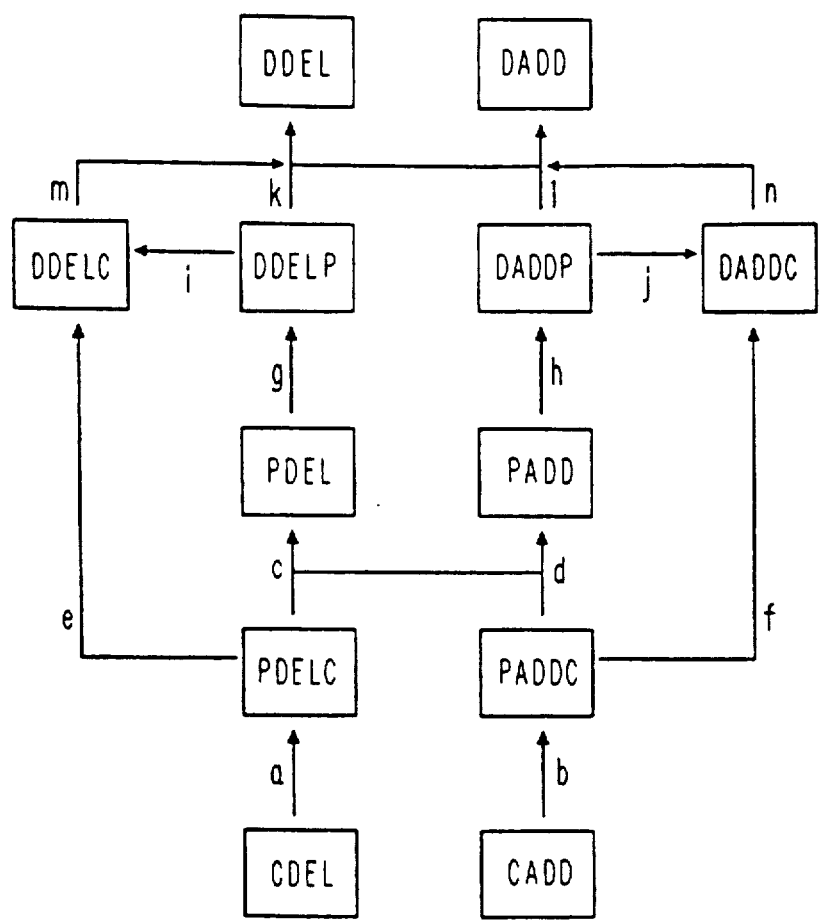
FIG. 10 is a logic flow chart illustrating the logic involved in creating follow-up CCB entries.

All rules for such follow-up entries are given in FIG. 10. In this figure, every arrow indicates a follow-up relation between two entries. When entries of different types (e.g. device/control unit) are related, this indicates an additional entry. When entries of the same type are related, it indicates a change of the entry. The letters in FIG. 10 signify the following:

a: For every CHPID (channel path) deleted, there must be entries to delete the CHPID from all control units on the CHPID.
b: For every CHPID added, there must be entries to add the CHPID to all control units on the CHPID.
c: When all CHPIDs are deleted from a control unit, the entries must be changed to delete and re-add the control unit.
d: When all channel paths are added to a control unit, the entries must be changed to delete and re-add the control unit.
e: For every channel path deleted from a control unit, there must be entries to delete the CHPID from all devices on the control unit.
f: For every CHPID added to a control unit, there must be entries to add the CHPID to all devices on the control unit.
g: For every control unit deleted, there must be entries to delete the control unit from all devices on the control unit.
h: For every control unit added, there must be entries to add the control unit to all devices on the control unit.
i: For every control unit deleted from a device, there must also be an entry to delete all channel paths from the device associated with the control unit from the device.
j: For every control unit added to a device, there must also be an entry to add all CHPIDs of the control unit to the device.
k: When all control units are deleted from a device, the entries must be changed to delete and re-add the device.
When this transition is valid, transition m must also be valid.

l. When all control units are added to a device, the entries must be changed to delete and re-add the device.
When this transition is valid, transition n must also be valid.
m: When all CHPIDs are deleted from a device, the entries must be changed to delete and re-add the device.
When this transition is valid, transition k must also be valid.
n: When all CHPIDs are added to a device, the entries must be changed to delete and re-add the device.
When this transition is valid, transition 1 must also be valid.

I/O Configuration Change Detection

In the MVS environment described in this embodiment of the present invention, as indicated above, Unit Control Blocks (UCBs) and the Eligible Device Table (EDT) describe the set of devices to the operating system (FIG. 1A at 104; FIG. 1B at 116). When the configuration definition of devices is dynamically added, deleted, or modified as above, MVS dynamically adds and deletes UCBs, and rebuilds the EDT. A mechanism for detecting these changes is required so that:

Programs which need to obtain information about the current I/O configuration (e.g. by scanning the set of UCBs representing the configuration) do not encounter inconsistent results when the set of UCBs representing the I/O configuration is changed.

Programs which are sensitive to the relationship between a device number and a UCB do not encounter inconsistent results when a device definition is dynamically modified from one device type to another (e.g. a device number which is initially defined as a 3350 DASD may later be defined as a 3380 or as a TAPE device).

Programs which maintain lists of UCB addresses and validate a given UCB address before using it do not encounter inconsistent results when a UCB is dynamically deleted and another UCB is later dynamically added at the same storage address.

Programs sensitive to the logical grouping of devices for the purpose of allocation do not encounter inconsistent results when the logical grouping of devices is dynamically changed.

A similar mechanism is required for when a dynamic device reconfiguration (DDR) swap (known to the prior art) occurs which exchanges the contents of two UCBs. A DDR swap changes the relationship between the device number and the UCB for the devices involved in the swap.

Figure 11:
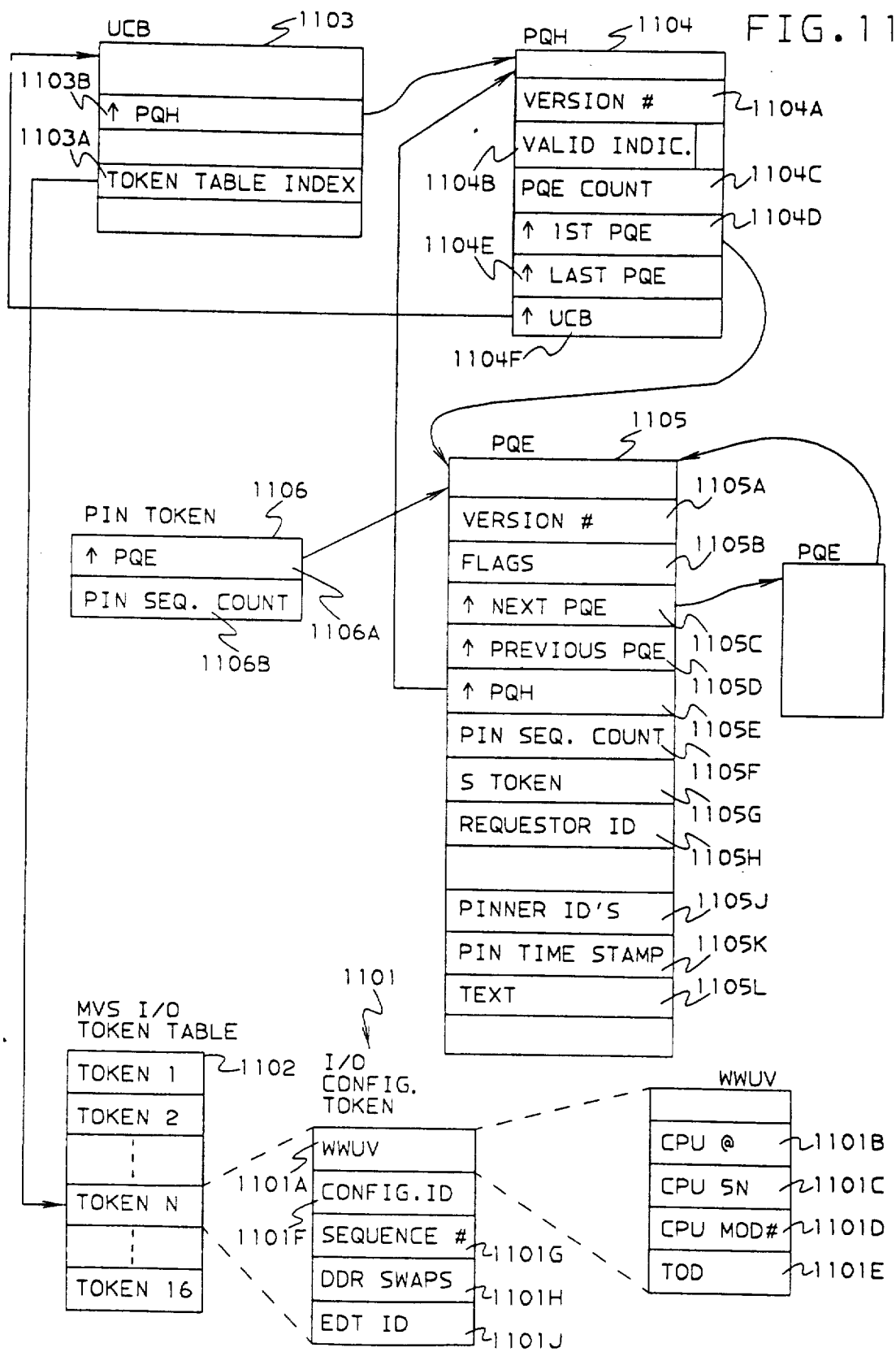
FIG. 11 is a control block diagram showing control blocks important to the present invention.

FIG. 11—describing control block structures key to the present invention—illustrates the following structures which provide for this I/O configuration change detection:
MVS I/O Configuration Token (1101)
MVS I/O Configuration Token Table (1102)
UCB Token Table Index (1103A).

MVS I/O Configuration Token—1101

The purpose of the MVS I/O Configuration Token is to uniquely identify to MVS the current state of the I/O configuration, as a whole, for the life of the IPL.

The MVS I/O Configuration Token can be used in conjunction with MVS programming services to ensure that the information that is received from the services is consistent with the configuration definition represented by the token.

Token Format

The MVS I/O Configuration Token is constructed from the following data:
IODF World Wide Unique Value (WWUV) 1101A
Note: The IODF is the I/O Definition File that contains all the I/O configuration definition data that MVS requires to initialize. This file is read by MVS during the initialization process to build the UCBs and EDT for the I/O configuration. The IODF contains a World Wide Unique Value (WWUV) that uniquely identifies the IODF.
The WWUV comprises:
CPU address 1101B
CPU serial number 1101C
CPU model number 1101D
TOD clock 1101E (at time of creation of IODF)
Operating system configuration identifier 1101F (an arbitrary 8-byte string unique to a particular configuration within an IODF)
Sequence number 1101G
Number of DDR swaps 1101H
EDT identifier 1101J The MVS I/O Configuration Token is created when the operating system completes initialization as part of the initial program load process.
The IODF WWUV is obtained from the IODF that was selected for the IPL.
The operating system configuration identifier is the one specified by the installation for IPL or the default identifier, if none was specified and only one operating system definition exists in the IODF used for IPL.
The sequence number is initialized to zero.
The number of DDR swaps is initialized to zero.
The initial EDT identifier is the one specified for IPL or the default identifier, if none was specified and only one EDT identifier exists in the IODF used for IPL.
The MVS I/O Configuration Token is updated for each of the following events:
A new I/O configuration definition is activated.
In this case, the new IODF WWUV and the new operating system configuration identifier are stored into the configuration token. Additionally, the configuration token sequence count is incremented. If the EDT is rebuilt, then the EDT identifier is updated.
A DDR swap occurs.
The DDR swap count is incremented in the configuration token.

MVS I/O Configuration Token Table 1102

The MVS I/O Configuration Token Table consists of an array of n elements (the preferred MVS implementation shows a table size of 16 entries). Each element in the array represents a valid MVS I/O configuration token.

During system initialization, the initial MVS I/O Configuration Token is stored in the first slot of the table. A new token is added to the table every time the MVS I/O configuration Token changes, that is whenever one of the following occurs:
a successful activation of a new I/O configuration definition
a DDR swap which exchanges the contents of two UCBs.
If the token table becomes filled up, each successive configuration change causes the tokens in the table to be shifted up so that the oldest token is removed (i.e. the last 16 are kept). This also requires the token table index value in each UCB 1103A to be updated to point to the proper token (see "UCB Token Table Index" for a description of the UCB token table index).

UCB Token Table Index 1103A

The UCB Token Table Index is a UCB field which contains an index into the MVS I/O configuration token table. This index represents the MVS I/O configuration token at the time this UCB definition was added or last changed.

The management of the token table index values works as follows:

All UCBs built at IPL contain an index of 0.

The initial entry in the token table (which has an index of 0) contains the MVS I/O configuration token which represents the I/O configuration definition at IPL.

Whenever a dynamic configuration change or DDR swap occurs, a new MVS I/O configuration token is created and added to the token table.

Whenever a UCB is dynamically added or dynamically modified, the token table index in that UCB is set to the index of the current token in the token table.

Whenever a DDR swap occurs, the token table index values in both affected UCBs are set to the index of the current token in the token table.

If the token table becomes filled up, each successive configuration change causes the tokens in the table to be shifted so that the oldest token is removed and the last 16 are kept. This also requires updating the token table index value in each UCB to point to the proper token.

Note: If the UCB index is already zero, it is left at zero. Therefore, if 17 configuration changes occur after the MVS configuration token is retrieved, services will detect a token mismatch and indicate that the device definition has changed.

Using the MVS I/O Configuration Token

As noted, the token can be used in conjunction with MVS programming services to ensure that information that is received from the services is consistent with the input token.

For a given dynamic configuration change, only the affected portions of the token will be updated. The programming services will ensure consistency with respect to the data being returned. For example, if a dynamic configuration change only updates the EDT, programming services which return UCB information will not indicate that anything is inconsistent.

The token can be used to detect the following four cases:

the set of UCBs has been dynamically changed
the definition of a particular device has been dynamically changed
the EDT has been dynamically rebuilt.
a device was involved in a DDR swap.

The MVS I/O configuration token concept allows a program to maintain a list of UCB addresses or device numbers without keeping all UCBs in the list pinned, provided that a configuration token is kept with the list. The configuration token will be used by the system service to ensure that the UCB definition is consistent with its definition represented by the configuration token. Specifically, the service will ensure that the device definition for the input device number or UCB address has not changed since the point in time represented by the input configuration token. If the token index in the UCB represents a more recent configuration token than the token received as input, then the service will indicate that the device definition is inconsistent with the input token (via a return code from the service).

Note: Since in the MVS implementation only the last 16 token are retained, it is possible that a program could retrieve the configuration token, 17 dynamic I/O configuration changes occur, and then the program detects a token mismatch even though the specific device definition has not changed.

The configuration token allows programs to detect the following cases which otherwise would not be detected:

the configuration definition for a particular device number is changed (because the service will validate both that a UCB exists for the device number and that the device definition is consistent with the token)

a UCB is deleted but a different UCB is later added at the same storage address (because the service will validate both that the UCB address represents a valid UCB and that the device definition is consistent with the token)

Device Pinning

As noted above, this invention provides a PIN mechanism for data integrity purposes, so that a device definition in-use by the system can be marked as ineligible for deletion. This PIN mechanism provides for:

Device pinning

Allowing an authorized program to request that a UCB (and its associated device related data structures) be marked ineligible for deletion, and Allowing an authorized program to request that all paths to a device be marked ineligible for deletion. This is more granular than device pinning. The separation of path pinning from device pinning allows paths to be dynamically deleted from pinned devices unless the paths are also pinned.

The critical data structures for the PIN mechanism are shown in FIG. 11. They include:

Pin Queue Header 1104

The Pin Queue Header is anchored from the UCB (1103B) and is composed of the following fields:
control block version number 1104A
flag indicating when the count of PQEs is not valid 1104B
count of PQEs on PQE chain 1104C
address of first PQE on PQE chain 1104D
address of last PQE on PQE chain 1104E
address of UCB 1104F.

Pin Queue Element 1105

The Pin Queue Elements are anchored from the PQH (via a double headed, double threaded queue) and are composed of the following fields:
control block version number 1105A flags 1105B
An indicator if the request is to last beyond address space termination.
An indicator if the pin was done for a task mode caller.
An indicator if the request was to pin all the paths to the device.
An indicator that the request was done during NIP.
address of first next PQE 1105C address of previous PQE 1105D
address of PQH 1105E
Pin sequence count 1105F
STOKEN for current primary address space 1105G (indicating the address space that did the pinning)
Component ID of requestor 1105H
PINNER ID 1105J ASID of SRB mode pinner; Address of job step TCB for task mode pinner
time and date of pin 1105K
pin text 1105L

PIN TOKEN 1106.

Figure 12A:
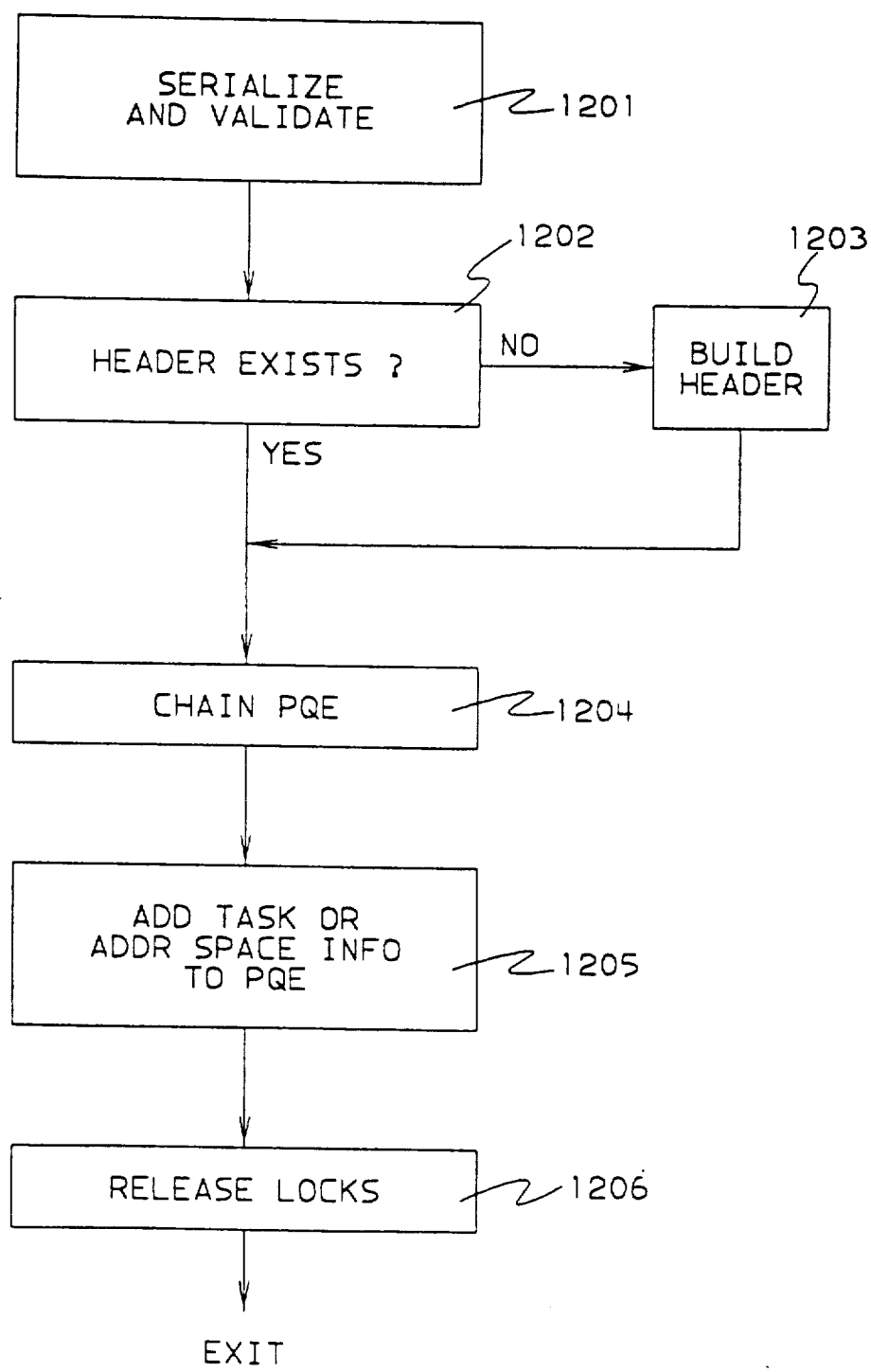
FIG. 12A is a flowchart showing the PIN function.

Pinners of devices are returned an 8 byte pin token. The pin token provides two functions:
uniquely identifies the PQE that is to be removed
provides a fast look up for the PQE that is to be deleted
The pin token has the following format:
PQE address 1106A
pin sequence count 1106B The PIN Service function is illustrated in FIG. 12A. At 1201, necessary serialization and validation is performed. (i.e., a lock (the ULUT lock) is obtained to serialize against dynamic configuration changes; and the UCB is locked to serialize the PIN queue. The UCB address is validated (before locking the UCB) by extracting the device number, performing a UCB look-up and ensuring that the resulting UCB address matches the input UCB address.) If no PQH exists 1202, one is built 1203 and chained off the UCB (see FIG. 11 at 1104). The pin sequence count (a counter to guarantee uniqueness of the PIN token) is updated (FIG. 11 at 1105F) and the PQE is added to the chain 1204 (See FIG. 11 at 1105). Next, task or address space information is added to the PQE 1205 to associate task mode pins to job step task TCB and to associated SRB mode pins to primary address space (see FIG. 11 at 1105J). Finally, the locks are released 1206 and a pin token is constructed and returned.

The UNPIN function is illustrated in FIG. 12B. At 1221 the input PIN token (see FIG. 11 at 1106) is validated (by ensuring that the PQE address is a valid PQE and that the PIN sequence count in the PIN token matches the sequence count in the PQE (see FIG. 11 at 1105F)) and the UCB lock is obtained to serialize the PIN queue. The PQE is removed from the PQE chain 1222 and if no PQEs remain on the chain 1223, the PQH is removed (FIG. 11 at 1103B, 1104). Finally, the UCB lock is released 1225.

Group Serialization

As noted above, the other major piece of the serialization technique is a group serialization mechanism to handle serialization requests for groups of devices while the group definitions are permitted to change.

Figure 13A:
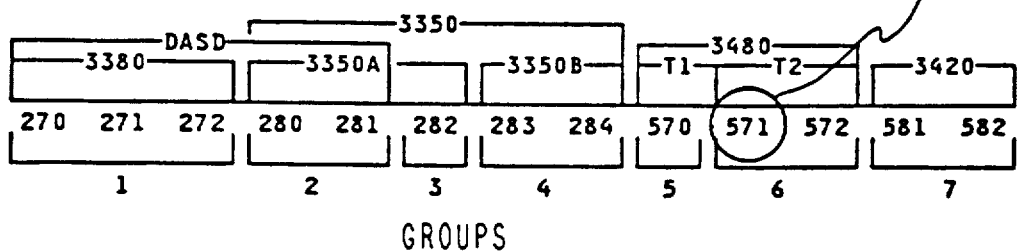
FIG. 13A is an illustration of a first set of allocation groups according to the prior art.

It is known in the prior art that users may supply unit names, or generic names, in requesting devices to be allocated to them. The operating system "allocation" function then translates these requests to requests for a specific device number (or set of device numbers). IBM's MVS/ESA Operating System is known to divide groups of device numbers up into "allocation groups" to accomplish this function, where an allocation group is defined as a set of devices that are in the same generic device type, and defined to exactly the same set of unit names. FIG. 13A illustrates seven such allocation group definitions, and FIG. 13B illustrates seven allocation groups in the same system after device 571 (formerly in group 6—FIG. 13A at 1301) has been redefined from unit name T2, to unit name T1 (and so in group 5—FIG. 13B at 1302).

It is further known in the prior art to include in the EDT "group masks" representing the allocation group(s) contained in a particular unit name. FIG. 13C illustrates the group masks corresponding to the definitions in FIG. 13A. For example, unit 3350 is shown (1303) as having three bits "on" to indicate that this unit name spans allocation groups 2, 3 and 4. These group masks have been used in the past in conjunction with a "global mask" in common storage to serialize access to particular groups. In the example illustrated in FIG. 13C, the global mask (1304) has a bit on indicating that group 5 is locked—so that a user attempting to allocate any unit name spanning group 5 (3480 or T1 in the example of FIG. 13C) would have to wait.

Figure 13B:
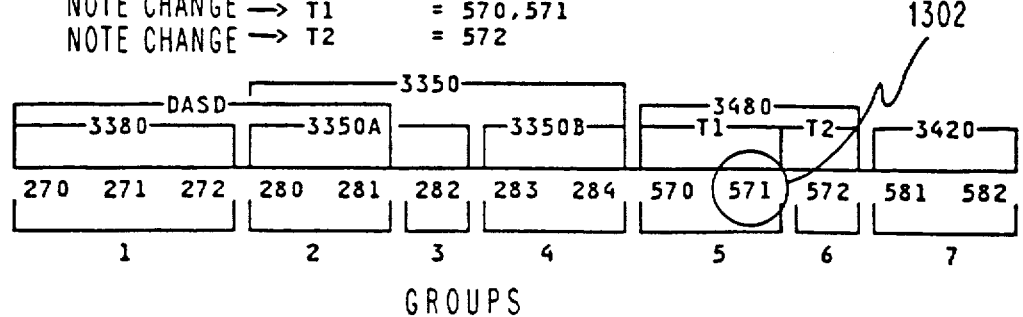
FIG. 13B is an illustration of a second set of allocation groups according to the prior art.
Figure 13C:
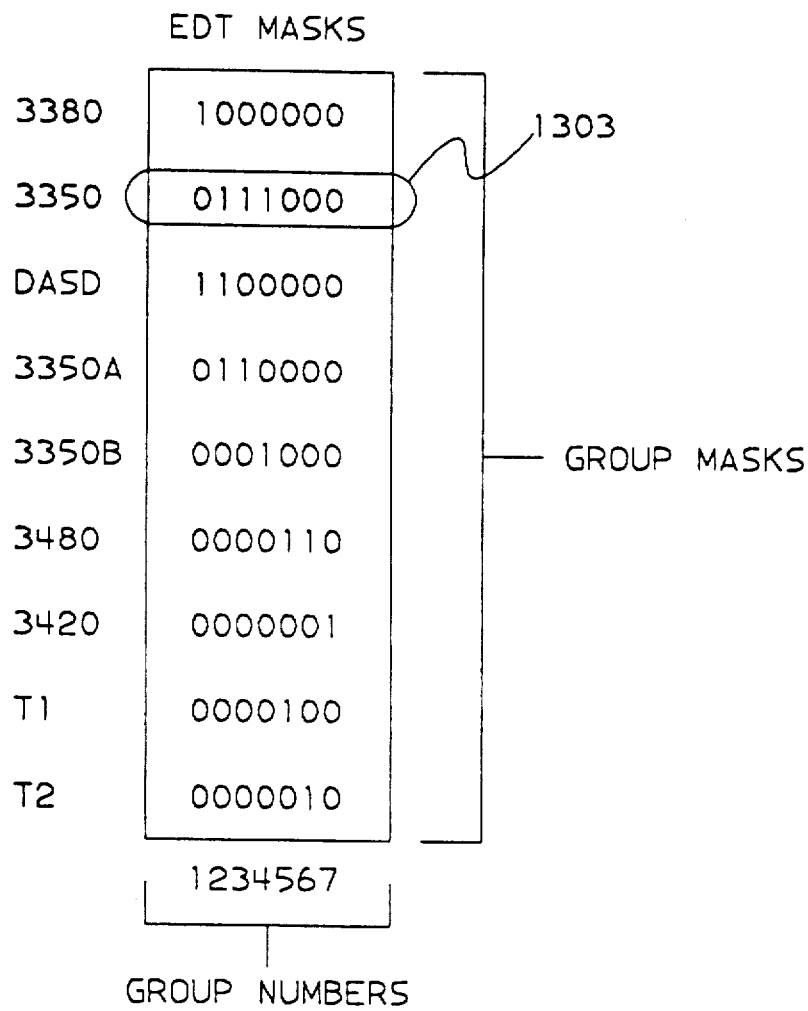
FIG. 13C is an illustration of EDT groups masks and a global mask according to the prior art.
Figure 13C:
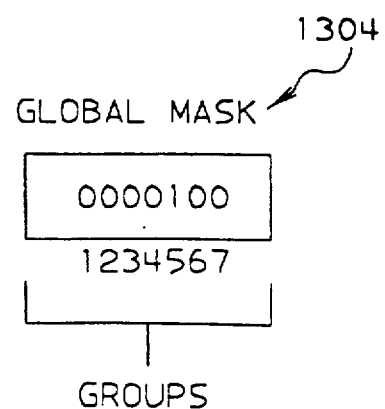

Since the present invention provides for a dynamically modifiable I/O configuration ("reconfiguration"), it is now possible for a device number to move between allocation groups—as device 571 has between FIG. 13A and 13B. Thus, without further accommodation, locking group 5 before the reconfiguration will not lock all devices part of the group after the reconfiguration (in particular, device 571).

Figure 14:
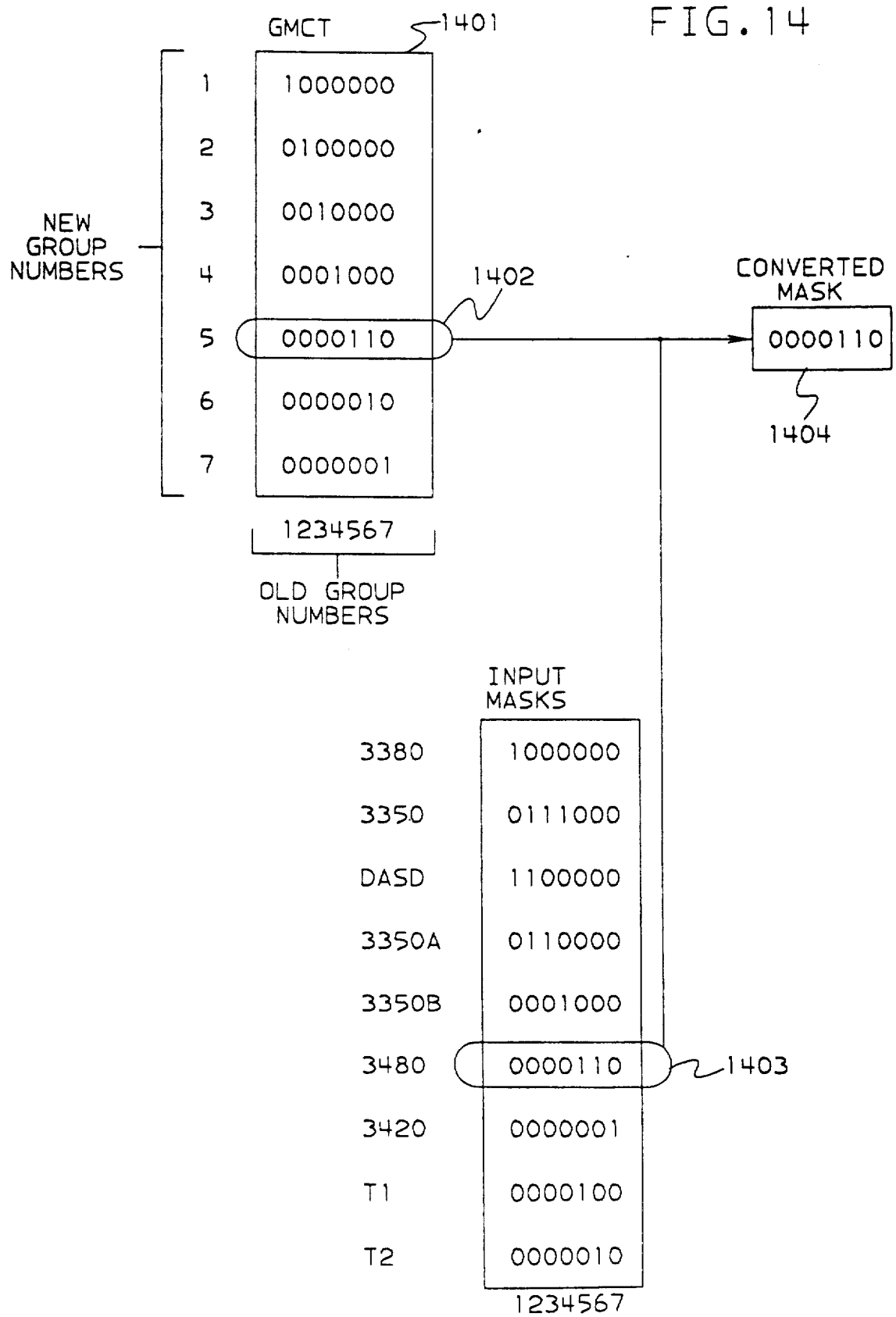
FIG. 14 is an illustration of the use of input masks on a GMCT to create a converted mask.

To solve this problem, the preferred embodiment of the present invention includes a "Group Mask Conversion Table" (GMCT) as part of the EDT, as illustrated in FIG. 14 at 1401. This table comprises a row corresponding to each allocation group, and is used to create "converted" group masks from the input group masks in an EDT during a reconfiguration (a "new EDT"). Using the reconfiguration example of FIGS. 13A-13C, the corresponding GMCT (FIG. 14 at 1401) is constructed as follows: each row in the GMCT corresponds to an allocation group in the new EDT; each column corresponds to an allocation group number in the old EDT. A bit is set in row X column Y if a device in (new) allocation group X occurs in (old) allocation group Y. Thus row 1402 (for new allocation group 5—see FIG. 13B) has bits 5 and 6 (see FIG. 13A) since devices 570 and 571 (new allocation group 5) span old allocation groups 5 (device 570) and 6 (devices 571 and 572).

The GMCT is then used in combination with an input mask (representing a particular set of allocation groups to be serialized) to create a "converted mask" as follows: each bit set in an input mask is used to select a row from the GMCT, and that row is logically ORed into the converted mask being built. For example, for unit 3480 the input mask is illustrated at 1403 in FIG. 14. Using this input mask results in logically ORing rows 5 and 6 of GMCT 1401, producing converted mask 1404.

Figure 15:
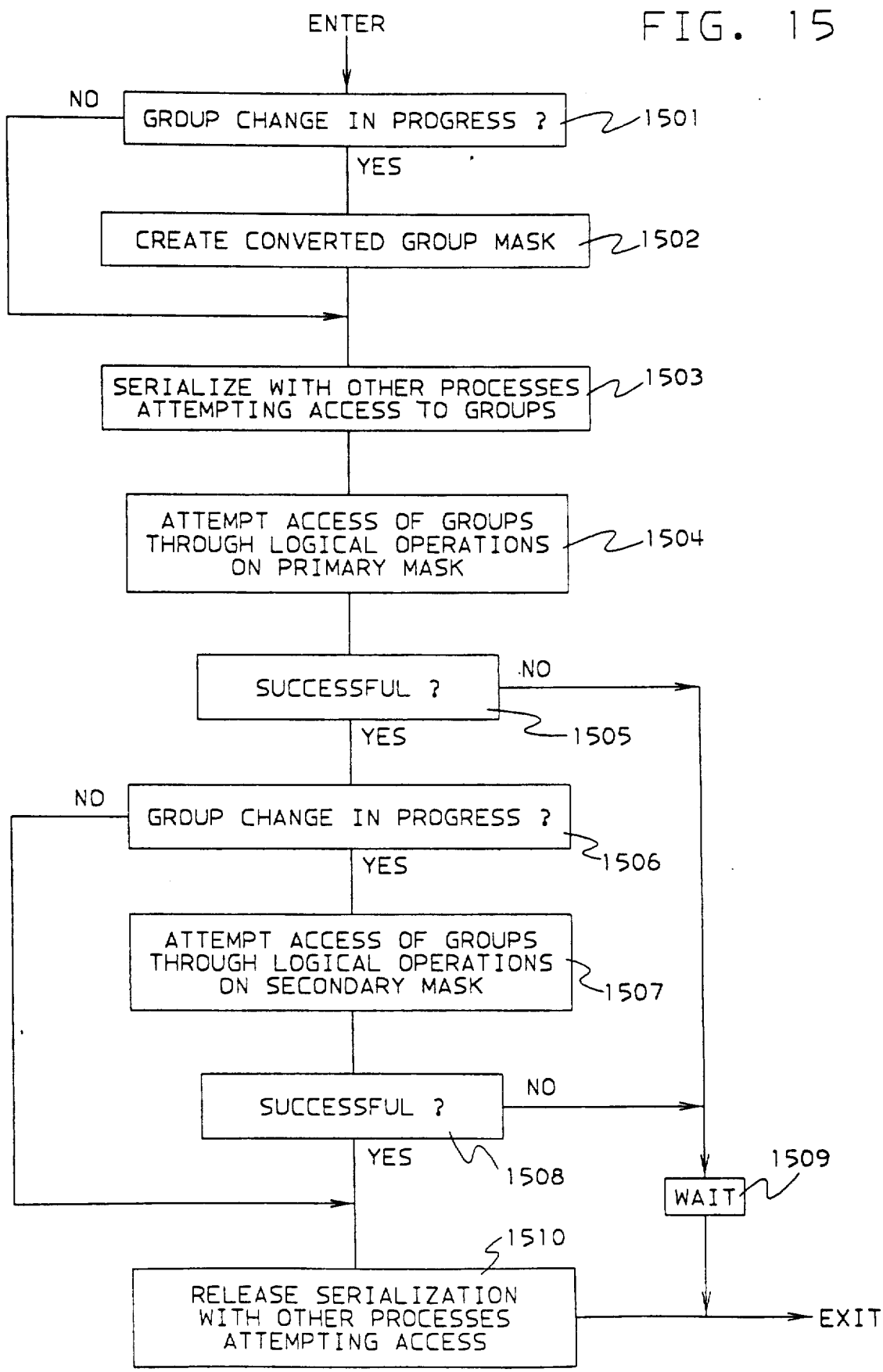
FIG. 15 is a flowchart showing control flow for obtaining exclusive access to an allocation group.

FIG. 15 illustrates how these concepts are tied together to obtain exclusive access to an allocation group. At 1501, a test is made whether a group change is in progress (a change is in progress if users of the old EDT exist concurrent with users of the new EDT. This is indicated by an indication in the new EDT). If so, a converted group mask is created 1502 by the method just illustrated, using the GMCT and the input group mask. Appropriate serializing locks are then obtained 1503 to serialize with other processes requesting access to groups. Using the input and the converted masks, attempts are made (1504, 1507) to obtain access to the required groups—the input mask is used against the (primary) global mask associated with the new EDT (representing "locked" groups), and the converted mask is used against the (secondary) global mask associated with the old EDT. (To illustrate: the global mask in FIG. 13 at 1304 shows that group 5 is locked, all other groups are not; attempting to allocate "3350" (1303) would succeed since groups 2, 3 and 4 are currently unlocked ("anding" mask 1303 with 1304 results in zeroes); subsequently, global mask 1304 would be "ORed" with mask 1303 to turn these 3 bits on, indicating that these three groups are now locked). Failure of the ANDing attempt would result in a conventional "wait" 1509 for a later "post" of the waiting process (first freeing up any primary groups already held). Finally, serializing locks are released, and the routine is exited.

Figure 16:
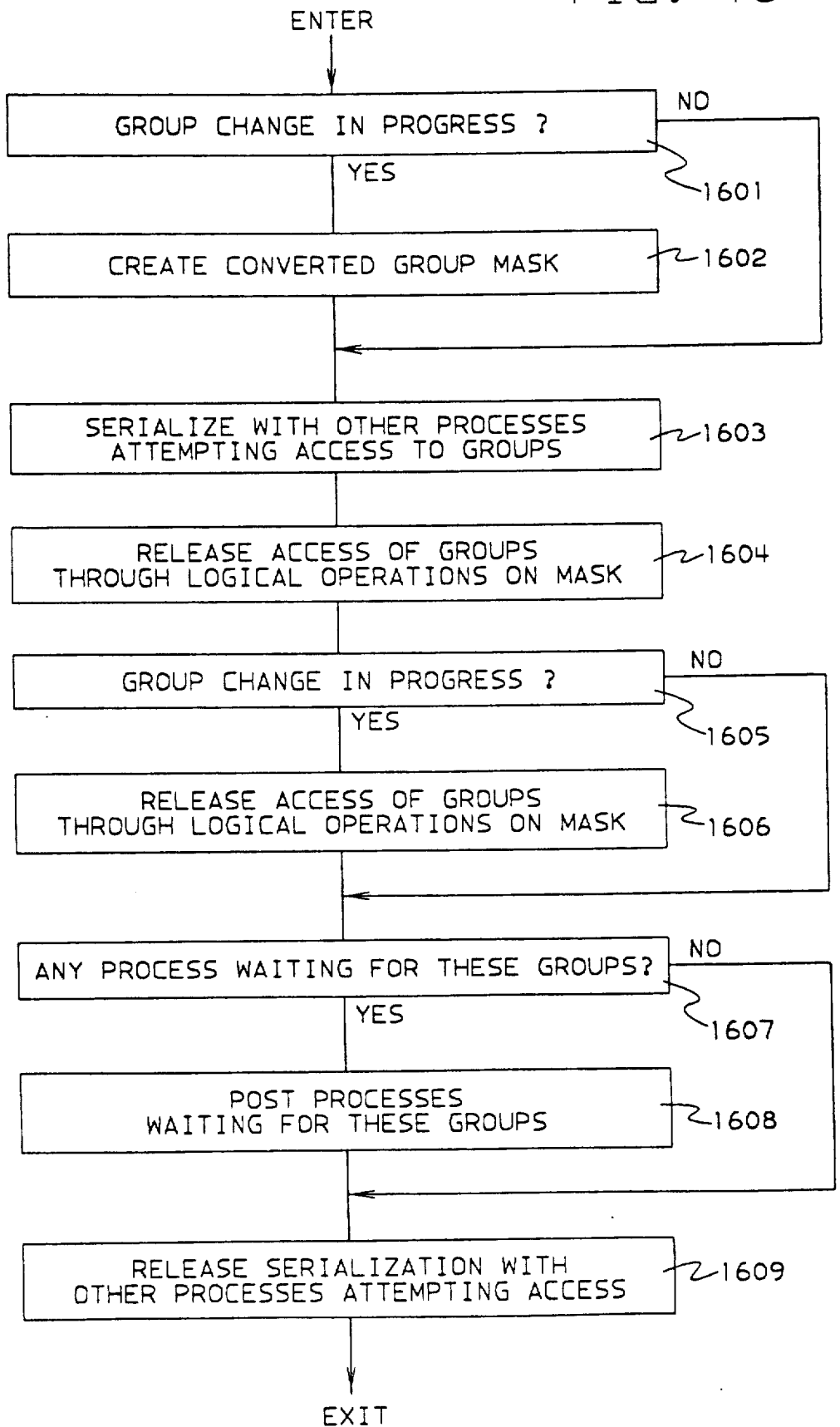
FIG. 16 is a flowchart showing control flow for releasing exclusive access to an allocation group.

FIG. 16 illustrates control flow required to release exclusive access to devices in a group. The logic closely parallels that described to obtain the access—tests whether a group change is still in progress (1601, 1605), creation of a converted mask (1602), and locking and unlocking (1603, 1609). The significant differences are that access to the groups is unconditionally released by Exclusive ORing the input mask with the primary global mask (1604) and the converted mask with the secondary global mask (1606); and any waiting processes are now "posted" conventionally (1608) before exiting.

APPENDIX A

```
Find the processor and the 0/S configuration ID
DO FOR each device in the old IODF
   Find the device in the new IODF
   IF the device in the old IODF is not found in the new
   IODF THEN
      Create a "delete device" entry in the CCB
   ELSE
   IF the software definition has changed THEN
      Create a "delete device" entry in the CCB to delete
         the old device, mark the entry as software only
      Create an "add device" entry in the CCB to add
         the new device, mark the entry as software only
      IF there are no control units in common between the
      old and new device THEN
         If there is a software only "delete device" entry for
         this device already in the CCB THEN
            Mark both the "delete device" and "add device"
               entries as both hardware and software
         ELSE
            Create a "delete device" entry for the device
            Create a "add device" entry for the device
      ELSE there are some CUs in common
         IF the new device has new control units THEN
            Create a "modify device" entry to add the con-
               trol unit
         IF the device in the new IODF is missing control
            units
            Create a "modify device" entry to delete the
               control unit
         IF the subchannel characteristics have changed
            Create a "modify device" entry to change the
               device characteristics (preferred path, inter-
               face timeout or illegal status detection)
ENDDO
DO FOR each device in the new IODF
   Find the device in the old IODF
   IF the device is not found THEN Create an "add
      device" entry to add the new device
ENDDO
DO FOR each control unit in the old IODF
   Find the control unit in the new IODF
   IF the old control unit is not found in the new IODF
   THEN
      Create a "delete control unit" entry to delete the
         control unit
   ELSE
   IF there are no CHPIDs in common between the
   control unit in the old IODF and the control unit in
   the new IODF OR the control unit definition has
   changed except for the unit address range THEN
      Create a "delete control unit" entry
      Create a "modify device entry" to remove the path
         for every device on the control unit that does not
         already have a "delete device entry" or a "add
         device entry" created for it. IF there is already a
         software delete or add entry for the device,
         change both the delete and add entry to do both
         hardware and software changes
      Create an "add control unit" entry
      Create a "modify device entry" to add the path for
         every device on the control unit that does not
         already have a "delete device entry" or a "add
         device entry" created for it. IF there is already a
         software delete or add entry for the device,
         change both the delete and add entry to do both
         hardware and software changes
   ELSE
      IF the control unit has additional
      CHPIDs THEN
         Create a "modify control unit" entry to add the
            CHPIDs
         Create a "modify device entry" to add the path
            for every device on the control unit that does
            not already have a "delete device entry" or a
            "add device entry" created for it. IF there is
            already a software delete or add entry for the
            device, change both the delete and add entry
            to do both hardware and software changes
      IF the control unit has CHPIDs removed
      THEN
         Create a "modify control unit" entry to delete
            the CHPIDs
         Create a "modify device entry" to remove the
            path for every device on the control unit that
            does not already have a "delete device entry"
            or a "add device entry" created for it. IF there
            is already a software delete or add entry for
            the device, change both the delete and add
            entry to do both hardware and software
            changes
      IF the control unit, unit address range has changed
      THEN
         Create a "modify control unit" entry to change
            the U/A range
ENDDO
DO FOR each control unit in the new IODF
   Find the control unit in the old IODF
   IF the control unit is not found THEN
      Create an "add control unit" entry
ENDDO
DO FOR each CHPID in the old IODF
   Find the CHPID in the new IODF
   IF the CHPID is not found THEN
      Create an "delete CHPID" entry
   ELSE
   IF the CHPID definition has changed THEN
      Create a delete CHPID entry
      Create either a "modify control unit" entry or a
         "delete control unit" entry for every control
``` unit on the CHPID (depending on whether the control unit has other paths) except those control units that already have delete entries or modify entries in the CCB Create a "modify device" entry of a "delete device" entry for every device on every control unit on the CHPID (depending whether there are alternate paths to the device) except for those devices that already have "delete device" entries in the CCB. If there is a software only delete and entry, then they are converted to both hardware and software changes.

Create an add CHPID entry

Create either a "modify control unit" entry for every control unit that had a path removed or was added in the step above Create a "modify device" entry or an "add device" entry for every device on every control unit that had path removed above.

ENDDO
DO FOR each CHPID in the new IODF
Find the CHPID in the old IODF
IF the CHPID is not found THEN Create an "add CHPID" entry
ENDDO

APPENDIX BB

I/O Definition File (IODF)

The hardware configuration will be saved in a file, called the I/O definition file (IODF). This file contains the I/O definition information for one or more processors. It contains the information necessary to:

Build an IOCDS member for each processor
Build UCBs for the devices in the I/O definition
Build one or more Eligible Device Tables (EDTs) for the devices in the I/O definition file.

In general the I/O Definition File consists of sets of records ordered into trees and connected together.

The I/O Definition File is constructed in such a way that it will allow a blocked sequential access to some of the records collected in a specific section (e.g., operating system device information, Generic definition table, and Allocation definition tables) with a high performance without the need to use the built in chaining possibilities.

In addition to collecting some of the record types into contiguous storage locations, there are special sets of definitions in the IODF such that different related records are grouped together into contiguous areas. Such sets of definitions are the Generic Definition Table (GDT) and the Allocation Definition Tables (ADT) whereas the ADTs itself are collected each after the other into an allocation definition area (ADA). The areas defined above are again grouped together for every operating system. Refer to FIG. 17.

The I/O definition file consists of the following sections:

File header, containing control information used by HCD.
This section contains control information as well as offsets to other sections of the IODF. The header resides at the origin of the IODF linear space. The header has a length of 4096 bytes.

Operating system record (OSS) section. Section starts on page boundary relative to the origin of the IODF. It contains all operating system records grouped together.
OSR . . .

The following sections are grouped together and repeated for each operating system configuration definition.

Generic definition table (GDT) section used by the operating system. Section starts on page boundary relative to the origin of the IODF. It contains generic definition records as follows:
(GGR GRR . . . ) . . .

Allocation definition area (ADA) section used by the operating system. Section starts on page boundary relative to the origin of the IODF. It contains the different allocation definition tables addressed by the ATRs. Organization of the different allocation definition records in ADA is as follows:
ADT. . . whereas an ADT is setup by (GUR. . . )(EGR ERR. . . ) . . .

Allocation definition table index section used by the operating system. Section starts on page boundary relative to the origin of the IODF. It contains operating system unique control information and it consists of the header records (ATR) of the allocation definition tables. The length of this section may vary depending on the number of the allocation definition tables defined.
ATR . . .

MVS Device record section used by the operating system. Section starts on page boundary relative to the origin of the IODF.
It contains the operating system device records (MDR for example) ordered by the four byte device number.
MDR . . .

NIP Console section used by the operating system. Section starts on page boundary relative to the origin of the IODF.
It contains the NIP Console records.
NCR . . .

Area independent from the operating system.

Channel path record section (CPS). Section starts on page boundary relative to the origin of the IODF. It contains all CPR records grouped together for each processor.
CPR . . .

Control unit attachment record section (CAS). Section starts on page boundary relative to the origin of the IODF. It contains all CAR records grouped together for each processor.
CAR . . .

Device attachment record section (DAS). Section starts on page boundary relative to the origin of the IODF. It contains all DAR records grouped together for each processor.
DAR . . .

Device record section (DVS). Section starts on page boundary relative to the origin of the IODF. It will contain all DVR records ordered by the device number.
DVR . . .

Control unit record section (CUS). Section starts on page boundary relative to the origin of the IODF. it contains all CUR records ordered by the control unit number.
CUR . . .

Unordered section. Section starts on page boundary relative to the origin of the IODF. It contains all the remainding records of the IODF. Records are stored without a grouping but in sequence of descending length. They can be addressed only using the imbedded fields of the corresponding tree structures.

The I/O definition file will consist of the following records:

IODF header record (IHR)
It contains control information (e.g., the WWUV) used by HCD, offsets to the roots of trees or to the beginning and end of IODF sections, length of different records, counters etc.

Operating system records (OSR)
For every operating system configuration there is one OSR defined.

Processor records (PRR)
There is one Processor Record (PRR) for each processor (processor configuration definition) defined in the IODF. Each PRR that is defined contains control information on a specific processor. The maximum number of processors that can be defined is 4096.

Each processor has to be defined with an up to 8 character alphameric name assigned by the user and used to address the PRR for the processor.

Channel path records (CPR)
There is a set of 256 Channel Path Records (CPR) for each processor defined in the IODF. Each CPR that is defined contains control information on the channel path attached to that processor. The processor name for a given processor is used to index to the set of 256 CPRs for that processor. The channel path identifiers (CHPID) that can be defined on a given processor are controlled by the Processor Information Table (PIT).

Partition records (PAR)
There is a set of 256 partition records for each processor defined in the IODF. Each partition record that is defined contains an 8-character partition name, a partition identifier and a count of channel paths assigned to the partition.
Note Only processors that have been defined for LPAR will have PARs defined. The processor name for a given processor is used to address the set of PARs for that processor. The maximum number of partitions that can be defined for a given processor is controlled by the associated Processor Information Table (PIT).

IOCDS records (ICR)
There is one set of IOCDS records for each processor defined in the IODF. Each IOCDS record contains the name of the IOCDS data set and information when the data set was updated last.
The maximum number of IOCDSs for a specific processor is controlled by the associated Processor Information Table (PIT).

Control unit records (CUR, CAR)
The information on physical control units is separated into two types of records.
1. Physical control unit record (CUR)
2. Control unit attachment record (CAR)
The physical control unit record contains processor independent information on the control unit such as unit, model, count of attached devices and unit address ranges of attached devices. There is one set of CURs in the IODF. The number of CURs that can be defined in the IODF is 65536.
As each physical control unit is defined, it is assigned an hexadecimal identifier in the range from 0000 to FFFF. This identifier is assigned by the user and used to address the CUR for the physical control unit.

The control unit attachment record contains processor specific information such as attached channel path IDs and the number of the LCR for the logical control unit the physical control unit belongs to. There is a set of CARs for each CUR attached to a given processor. The physical control unit identifier is used to address the CARs of a given processor. The processor name for a given processor is used to address the set of CARs for that processor.

Logical Control unit records (LCR)
There is a set of LCRs for each processor defined in the IODF. Each LCR that is defined contains control information on a logical control unit connected to that processor. The processor name for a given processor is used to address the set of LCRs for that processor. The IODF will not contain LCRs for LPAR duplicated control units. These will be generated dynamically as the IOCDS is being built. The number of logical control units that can be defined for a given processor cannot exceed the maximum logical unit count specified in the Processor Information Table (PIT) for that processor. LCRs and logical control unit numbers are dynamically created by the hardware configuration routines. LCR numbers will be provided searching to the first unused number between 0 and the limit number (mentioned above) for a specific processor.

Device records (DVR, DAR)
The information on devices is separated into two types of records.
1. Device Record (DVR)
2. Device Attachment Record (DAR)
The device record contains processor independent information on the device such as unit, model, features, count of attached physical control units and numbers of attached physical control units. There is one set of DVRs in the IODF. The number of DVRs in this set is limited to 65536.
As each device is defined, it is assigned an hexadecimal number in the range from 0000 to FFFF. This number is assigned by the user and used to address the DVR for the device.

The device attachment record contains processor specific information such as preferred channel path. There is a set of DARs for each DVR attached to a given processor. The device number is used to address the DARs of a given processor. The processor name for a given processor is used to address the set of DARs for that processor.

Location and Unit Identification Records (LOR)
These records are optional. They contain additional information for the processors (PRR), control units (CUR), devices (DVR), and channel paths (CPR). They are chained to the basic records as an extension. They are not chained together and are transparent to the repository user. Thus the basic records are shorter and can be read in with a better performance by the processing routines. These records contain the location identification, and serial number of the corresponding hardware units.

NIP Console Records (NCR)

There is one set of NCRs which will define which devices can be used as NIP consoles. A maximum of 128 NIP consoles can be specified. The NCRs have to be added to the system defining their order number (numbers 1 to 256 can be used) such, that the user wants to select the devices as a NIP console.

NCRs contain the HEX device number of the console with unit and model specification. The IODF header (IHR) will contain the offset to the NCRs as well as the count of NCRs specified.

Operating system device records (for example MDR for MVS)

This contains the operating system dependent device information.

Device Usage Records (DUR)

There is one set of DURs for each device defined in the IODS. DURs of the same device are chained together and the chain is connected to the corresponding DVR record.

DURs contain the offset to either an esoteric group record (EGR) or a NIP console record (NCR) the device is assigned to.

Generic device Group Records (GGR)

All GGRs are chained together. The anchor is placed in the operating system record. The offset of the GGR is stored in the DVR records for reference.

The GGR contains the name of the generic device group that is used. It is the anchor point of the Generic Range definition Records (GRR). It contains the number of GRRs chained to the GGR.

Allocation definition Table Records (ATR)

It is the index record to address the ADTs. There is one ATR entry for each ADT. As each ADT is defined, it is assigned a two byte alphanumeric identifier by the user. The ATRs of different ADTs are chained together. The anchor is placed in the operating system record.

The ATR is the anchor point of the records building an allocation definition table.

ATRs contain information about creation and update of the ADT. They provide addressing possibilities to the Esoteric device Group Records (EGR) and to the Generic Update Records (GUR) of an ADT. Records (GUR)

Generic Update

GURs of the same ADT are chained together. The chain header is located in the ATR.

The GUR is identified by the name of the generic device group and contains an overwrite to the corresponding generic specification. It specifies a user defined preference number for the generic and indicates which generic is eligible for VIO. No GRRs are connected to GURs. The GRRs of the corresponding GGR in the System Generic definition Table (GDT) contain the device specifications.

Esoteric device Group Records (EGR)

EGRs of the same ADT are chained together. The chain anchor is placed in the ATR.

The EGR is the anchor point of the Esoteric Range definition Records (ERR) associated with the ADT.

The EGR contains the name of an esoteric device group that have been defined. It also indicates which esoteric is eligible for VIO. It contains the number of ERRs chained to the EGR, and the ATR offset for backwards reference.

Generic Range definition Records (GRR)

GRRs are used with GDT.

GRRs of the same GDT are chained together. The chain header is located in the group record (GGR). The GRR contains the range specification for a sequence of consecutive device numbers belonging to an generic group. The device numbers stored in the GRR can be used to address the corresponding DVRs.

Esoteric Range definition Records (ERR)

ERRs are used with ADT.

ERRs of the same ADT are chained together. The chain header is located in the group record (EGR). The ERR contains the range specification for a sequence of consecutive device numbers belonging to an esoteric group. The device numbers stored in the ERR can be used to address the corresponding DVRs.

APPENDIX C

LCU Split/Merge

A logical control unit (LCU) is a prior art implementation construct used by the channel subsystem to represent a set of physical control units that physically or logically attach I/O devices in common. IOCP builds LCUs from input provided to define the I/O configuration. At POR, LCUs become part of the I/O configuration definition contained in the hardware system area (HSA).

An LCU is created by IOCP for:

Each physical control unit with no I/O devices.
Each physical control unit that does not share any I/O devices with other physical control units.
Each group of control units that share I/O devices between them.

The described embodiment does not support splitting or merging of LCUs when ACTIVATE'ing a new I/O configuratin definition. An LCU split would occur if a path from a control unit to an I/O device or an I/O device is deleted and the deletion causes the physical control units, that were part of the LCU, to no longer have an I/O device in common. Similarly, an LCU merge would occur if a path from a control unit to an I/O device or an I/O device is added and the addition causes physical control units, that were part of different LCUs, to connect to an I/O device in common.

Splitting or merging of LCUs is only allowed if one of the LCUs does not have any devices attached. This restriction is enforced as part of the comparison processing between the source and the target configuration definition prior to determining the set of changes required. Enforcement is done beforehand in order to prevent disruption within a set of planned changes. Refer to the following for details on the method used.

Loop through all devices in the old IODF
  If the device is connected to 2 or more PCUs then
    consider device as possible candidate for split-do
    Loop through all PCUs connected to the device in the old IODF
      Collect all those PCUs that also exist in the new IODF
    end loop through all PCUs on old device
    Compare every pair of the collected PCUs in the new IODF—do If both PCUs are on different LCUs then a split was performed here—do (check for illegal split)
   If both LCUs the PCUs belong to in the new IODF contain at least one device that was part of the LCU in the old IODF and that has PCUs in common between the old and the new IODF then *** ILLEGAL SPLIT ***
  end
end
end
End loop through all devices
Loop through all devices in the new IODF
  If the device is connected to 2 or more PCUs then consider device as possible candidate for merge-do
    Loop through all PCUs connected to the device in the new IODF
      Collect all those PCUs that also exist in the old IODF
    end loop through all PCUs on new device
    Compare every pair of the collected PCUs in the old IODF—do
      If both PCUs are on different LCUs then a merge was performed here—do (check for illegal merge)
        If both LCUs the PCUs to belong to in the old IODF contain at least one device that is part of the LCU in the new IODF and that has PCUs in common between the new and the old IODF then *** ILLEGAL MERGE ***
      end
    end
  end
End loop through all devices.

What is claimed is:

1. In a computer system having a central processor, input/output units in an input/output subsystem attached to the central processor, and an operating system, a system for dynamic reconfiguration of one or more of said input/output units comprising:
A) definitional means for creating, on a configuration definitional file, one or more configuration instances, each configuration instance representing an associated configuration of said one or more of said input/output units;
B) a current configuration instance, created by said definitional means, and representing a first associated configuration;
C) a future configuration instance, created by said definitional means, and representing a second associated configuration;
D) system initialization means for creating, for said current configuration instance, one or more dynamically changeable software control blocks describing the first associated configuration to the operating system;
E) hardware initialization means for creating, from said current configuration instance, one or more dynamically changeable hardware control blocks describing the first associated configuration to the input/output subsystem;
F) activate means for creating from said current configuration instance and said future configuration instance, a configuration change block describing changes to be made to said software control blocks and said hardware control blocks when changing from said first associated configuration to said second associated configuration; and
G) dynamic actuation means for creating, from said configuration change block, changes to said hardware control blocks and said software control blocks so that, if said creating changes is successful, said software control blocks describe the second associated configuration to the operating system, and said hardware control blocks describe the second associated configuration to the input/output subsystem and if said creating changes is not successful, a change creation error indication is set.

2. The system of claim 1 further comprising validation means linked to said activate means for detecting whether said changes are valid and setting a validation error indication if said changes are detected to be invalid.

3. The system of claim 1 further comprising back-out means linked to said validation means and to said dynamic actuation means for detecting the setting of said validation error indication and said change creation error indication and, if either indication is so detected to be set, restoring said software control blocks and said hardware control blocks to again describing said first associated configuration.

4. In a computer system having a central processor, input/output units in an input/output subsystem attached to the central processor, and an operating system, a method for dynamic reconfiguration of one or more of said input/output units comprising the steps of:
A) creating a current configuration instance data set defining a current hardware configuration of said input/output units;
B) creating from said current configuration instance data set a current hardware configuration definition defining said current hardware configuration to said input/output subsystem;
C) creating from said current configuration instance data set a current software configuration definition defining said current hardware configuration to said operating system;
D) creating a future configuration instance data set defining a future hardware configuration of said input/output units;
E) creating from said current configuration instance data set and said future configuration instance data set, a configuration change block representing changes to be made to said current hardware configuration definition and said current software configuration definition to create a future hardware configuration definition defining said future hardware configuration to said input/output subsystem, and a future software configuration definition defining said future hardware configuration to said operating system; and
F) using said configuration change block to make said changes to said current hardware configuration definition and said current software configuration definition.

5. The method of claim 4 further comprising, after the step of creating said configuration change block, the step of detecting whether said changes are valid and backing out of said changes if said changes are not valid.

6. The method of claim 5 further comprising, after the step of using said configuration change block to make said changes, the step of detecting whether said changes were successfully made and backing out of said changes if said changes were not successfully made.

* * * * *